US010000603B2

(12) United States Patent
Sotzing et al.

(10) Patent No.: US 10,000,603 B2
(45) Date of Patent: Jun. 19, 2018

(54) ORGANOTIN ESTER POLYMER COMPOSITIONS, METHODS OF MANUFACTURE, AND USES THEREOF

(71) Applicant: THE UNIVERSITY OF CONNECTICUT, Farmington, CT (US)

(72) Inventors: Gregory Allen Sotzing, Storrs, CT (US); Aaron Baldwin, Canterbury, CT (US)

(73) Assignee: THE UNIVERSITY OF CONNECTICUT, Farmington, CT (US)

( * ) Notice: Subject to any disclaimer, the term of this patent is extended or adjusted under 35 U.S.C. 154(b) by 0 days. days.

(21) Appl. No.: 14/950,924

(22) Filed: Nov. 24, 2015

(65) Prior Publication Data

US 2016/0222172 A1 Aug. 4, 2016

Related U.S. Application Data

(60) Provisional application No. 62/109,353, filed on Jan. 29, 2015.

(51) Int. Cl.
*C08G 63/68* (2006.01)
*C08G 63/81* (2006.01)

(52) U.S. Cl.
CPC ............ *C08G 63/81* (2013.01); *C08G 63/681* (2013.01)

(58) Field of Classification Search
CPC ....... C08G 79/12; C08G 63/81; C08G 63/681
See application file for complete search history.

(56) References Cited

U.S. PATENT DOCUMENTS

| 3,426,002 | A | * | 2/1969 | Frankel | ................. | C08G 79/12 |
| | | | | | | 523/122 |
| 4,231,949 | A | | 11/1980 | Cerpini et al. | | |
| 4,292,252 | A | | 9/1981 | Collins et al. | | |
| 5,446,112 | A | * | 8/1995 | Hamilton | ............... | C08G 79/12 |
| | | | | | | 528/271 |
| 8,557,672 | B2 | | 10/2013 | Forbes et al. | | |
| 8,613,975 | B2 | | 12/2013 | Chalker et al. | | |
| 8,653,573 | B2 | | 2/2014 | Vaartstra | | |
| 2016/0222171 | A1 | | 8/2016 | Sotzing et al. | | |

FOREIGN PATENT DOCUMENTS

| CN | 101838279 A | 9/2010 |
| JP | 54088319 A | 7/1979 |

OTHER PUBLICATIONS

Carraher, Charles E., Jr.; Dammeier, Roger L., "Production of organometallic polymers by the interfacial technique. XV. Synthesis and partial reaction characterization of some group IV polyesters," 1970, Polymer Preprints (American Chemical Society, Division of Polymer Chemistry), 11, 606-612.*

(Continued)

*Primary Examiner* — Nicholas E Hill
(74) *Attorney, Agent, or Firm* — Cantor Colburn LLP

(57) ABSTRACT

Disclosed are organotin ester polymers, methods of manufacture, and uses thereof. The organotin ester polymers exhibit both high dielectric constant and low conductivity suitable for use as dielectric insulating materials.

20 Claims, 8 Drawing Sheets

(56) References Cited

OTHER PUBLICATIONS

Carraher, Charles E., and Roger L. Dammeier. "Production of organometallic polymers by the interfacial technique. XI. Synthesis of poly (organotin esters) and a study of some associated reaction variables." Die Makromolekulare Chemie 135.1 (1970): 107-112.*
Carraher, Charles E., and Roger L. Dammeier. "Comparative synthesis of oligomeric group IV polyesters." Journal of Polymer Science Part A—1: Polymer Chemistry 10.2 (1972): 413-417.*
Arbatti, M. et al., "New high-dielectric-constant polymer-ceramic composites", Materials Research Society symposia proceedings, 2005, pp. 327-332, vol. 847.
Baldwin et al. "Poly(dimethyltin glutarate) as a Prosepective Material for High Dielecteric Applications" Macromolecular Rapid Communications, 2014, 35(21): 2082-2088.
Baldwin et al. "Rational Design of Organotin Polyesters" Macromolecules 2015, 48, 2422-2428.
Baldwin et al.; Effect of Incorporating Aromatic and Chiral Groups on the Dielectric Properties of Poly(dimethyltin esters) Macromolecular Rapid Communications, 2014 35(24):2082-2088.
Baldwin, A. et al, "Rationally Designed Poly(dimethyltin esters) as High Dielectric Constant Organometalic Polymers for Energy Storage Applications"; Adv. Matter 27; 346 (2015) Abstract only.
Baldwin, Aaron, "Synthesis of Next Generation Dielectric Materials through Rational Exploration of Chemical Space" (2014). Doctoral Dissertations. Paper 464.
Carraher, C. E., "Organotin Polymers", Macromolecules Containing Metal and Metal-Like Elements: Group IVA Polymers, 2005, vol. 4, Ch. 10, pp. 263-310, John Wiley & Sons, Inc., Hoboken, NJ.
Carraher, C. et al, "Lead (IV) Polyesters From a New Solution System" Organometallic Polymers, 1978, pp. 101-106.
Florjanczyk et al., "Polymer electrolytes based on PEO and aluminum carboxylates" Solid State Ionics, 2002 152-153():227-234.
Frankel et al., "Organotin Polyesters" Journal of Applied Polymer Science, 1965 9(10):3383-3388.
JP 54088319; English Abstract; Jul. 13, 1979; 3 pages.
JPS5488319A; Application No. JP19770156173; 19771224; Machine Translation; 9 pages.
Song et al., "Improving the dielectric constants and breakdown strength of polymer composites: effects of the shape of the BaTiO3 nanoinclusions, surface modification and polymer matrix" Journal of Materials Chemistry, 2012 22 (32):16491-16498.
Tran, H. et al, "First-principles design of organotin polymeric dielectrics", Institute of Materials Science, University of Connecticut, APS March Meeting, Mar. 3, 2014, Denver, CO.
Tran, H. et al, "Organotin polymeric dielectrics for energy-storage applications", Institute of Materials Science, University of Connecticut, APS March Meeting, Mar. 3, 2014, Abstract.

* cited by examiner

ORGANOTIN ESTER POLYMER COMPOSITIONS, METHODS OF MANUFACTURE, AND USES THEREOF

CROSS REFERENCE TO RELATED APPLICATION

This application claims the benefit of U.S. Provisional Application No. 62/109,353 filed Jan. 29, 2015, which is hereby incorporated by reference in its entirety.

Government License Rights

This invention was made with government support under U.S. Office of Naval Research Grant No. N00014-10-1-0944 awarded by the U.S. Office of Naval Research. The U.S. government has certain rights in the invention.

BACKGROUND

This disclosure relates to organotin ester polymers, methods of manufacture, and uses thereof, for example as dielectric insulating materials.

Dielectric insulating materials used in applications such as capacitors, field effect transistors, electromechanical systems, and photovoltaics desirably have a large dielectric constant (Dk), a large energy band gap, low loss, and low conductivity. It is a further advantage if the materials are light-weight and readily manufactured. Current commercially available insulating materials include ceramics and certain polymers. Commercial polymers for use as dielectric materials include polyolefins, due to the favorably low conductivity of these materials. Compared to dielectric ceramics, these polymers meet industry needs for lighter weight and easier processing. On the other hand, such polymers are known to have either a low dielectric constant or low band gap, or both, making them less suitable for the target applications.

To increase the dielectric constant of insulating polymers, two methods have been used. One approach includes incorporating a larger permanent dipole moment within the polymer backbone to increase orientational polarization. The approach has been applied to polyvinyldiene fluoride (PVDF) since it has a large band gap (about 6 eV). A second approach has been the addition of inorganic, high dielectric constant fillers to introduce interfacial polarization between the filler particles and polymer. However, both of these methods have limitations. Although PVDF has a dielectric constant of greater than 10, it is ferroelectric in nature and suffers from large dielectric losses. Filled insulating polymers require large volumes of particles to reach percolation of the dielectric constant and, as a result, can suffer from a decrease in the dielectric breakdown field.

There accordingly remains a need in the art for polymeric materials that exhibit a high dielectric constant, high energy band gap, low loss, and low conductivity, properties that make these polymeric materials suitable for use in applications including high energy density capacitors, printed circuits, and gate dielectrics for transistors.

SUMMARY

Disclosed herein are organotin ester polymers comprising units of formula (I)

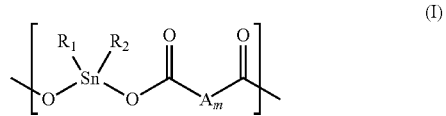

wherein $R_1$ and $R_2$ are each independently substituted or unsubstituted $C_{1-12}$ alkyl, substituted or unsubstituted $C_{3-12}$ cycloalkyl, substituted or unsubstituted $C_{6-12}$ aryl, substituted or unsubstituted $C_{3-6}$ heteroalkyl, substituted or unsubstituted $C_{2-12}$ alkynyl, or substituted or unsubstituted $C_{2-12}$ alkynyl;

A is substituted or unsubstituted $C_{1-36}$ hydrocarbylene, divalent heteroaryl, or ether; and m is 0 or 1, wherein the polymer has a number average molecular weight, $M_n$, of 20,000 g mol$^{-1}$ or greater.

Further disclosed are processes for producing the above-described polymers, comprising contacting an organic dicarboxylic acid or derivative thereof and a diorganotin dihalide.

Also disclosed herein are compositions and articles comprising the above-described polymers, in particular the article can be a dielectric substrate for use in electronic articles.

BRIEF DESCRIPTION OF THE DRAWINGS

In FIGS. 1A and 1B, tin atoms are six-fold coordinated by four oxygen atoms from ester groups and two carbon atoms from two methyl groups.

DETAILED DESCRIPTION

Figure 1A:
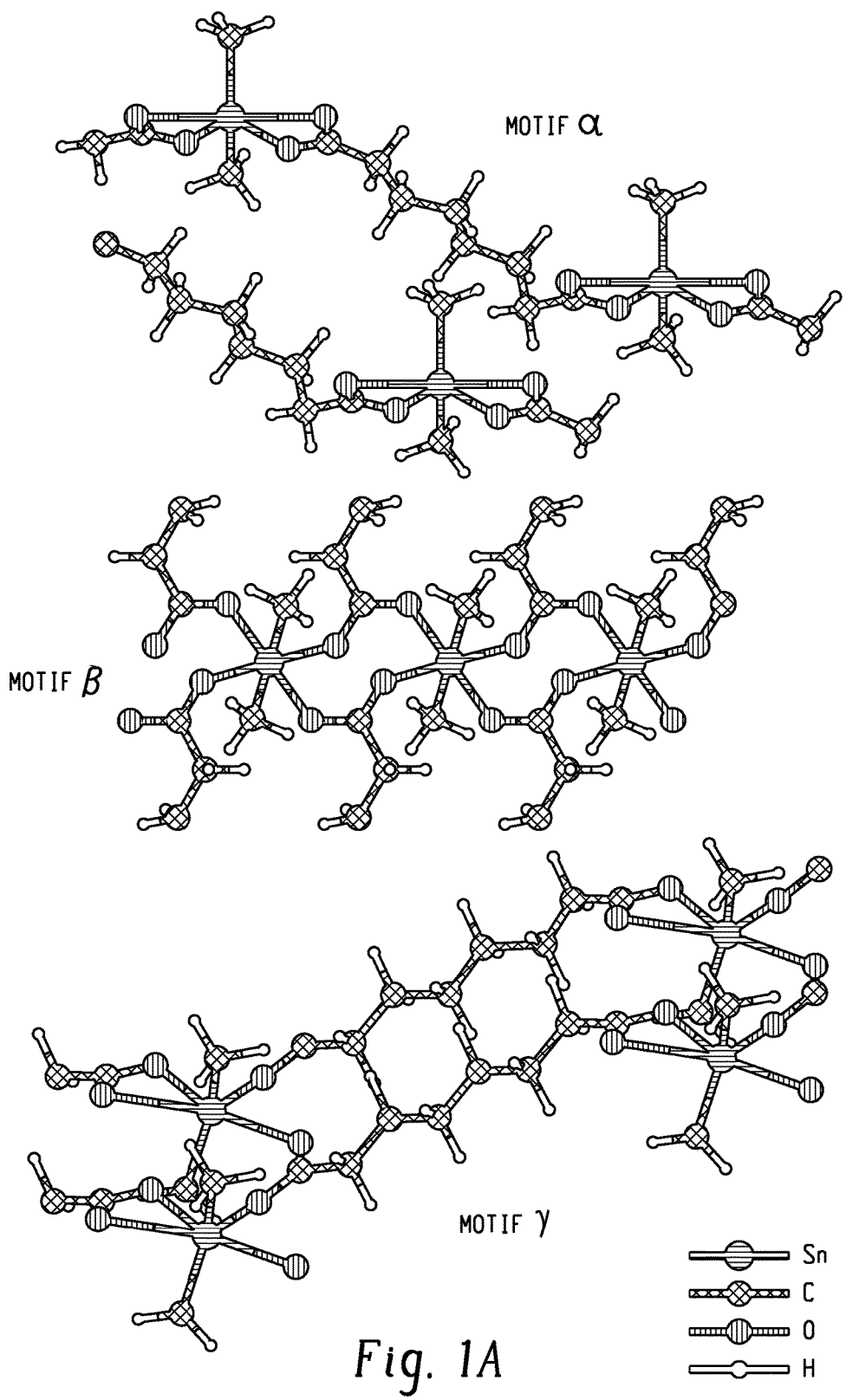
FIG. 1A shows lowest-energy structures of a (intra-chain), β (inter-chain) and γ (hybrid) motifs predicted for p(DMT-Sub)

The inventors hereof have discovered organotin ester polymers and compositions comprising the organotin ester polymers that exhibit both high dielectric constant and low conductivity. Without being bound by theory, it is believed that the high dielectric constant is achieved through the binding of the tin to an electronegative heteroatom such as N, O, or S. As a result of such binding, the large difference in electronegativity between tin and the heteroatom gives rise to a higher dipole moment and, therefore, a higher dipolar orientation within the polymer. In addition it is believed that due to the affinity of tin to coordinate heteroatoms preferentially, the polymer backbone will be oriented in a number of complex octahedral structures. Each of these structures will affect the total dielectric constant since there is a difference in both dipolar and ionic orientation. The inventors have further discovered that the dielectric constant of these compositions can be further increased through coordination of small, high dielectric constant ligands, such as water, ammonia, or hydrogen sulfide, with the polymers.

The organotin ester polymers comprise units of formula (I), which can be prepared by single phase step growth polymerization.

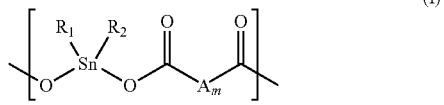
(I)

In formula (I), $R_1$ and $R_2$ are each independently substituted or unsubstituted $C_{1-12}$ alkyl, substituted or unsubstituted $C_{3-12}$ cycloalkyl, substituted or unsubstituted $C_{6-12}$ aryl, substituted or unsubstituted $C_{3-6}$ heteroalkyl, substituted or unsubstituted $C_{2-12}$ alkynyl, or substituted or unsubstituted $C_{2-12}$ alkynyl. In an embodiment, $R_1$ and $R_2$ are each independently substituted or unsubstituted $C_{1-12}$ alkyl, for example substituted or unsubstituted $C_{1-8}$ alkyl, specifically unsubstituted $C_{1-6}$ alkyl. In an embodiment, $R_1$ and $R_2$ are both methyl.

Further in Formula (I), m is 0 or 1. When m is 0, a single bond connects the two carbonyl carbon atoms. A is a divalent group such as a substituted or unsubstituted $C_{1-36}$ hydrocarbylene, a divalent heteroaryl, or an ether. In an embodiment, A is a divalent group such as substituted or unsubstituted $C_{1-36}$ hydrocarbylene, preferably substituted or unsubstituted $C_{1-12}$ alkyl, substituted or unsubstituted $C_{3-12}$ cycloalkyl, substituted or unsubstituted $C_{6-12}$ aryl, substituted or unsubstituted $C_{3-6}$ heteroalkyl, substituted or unsubstituted $C_{2-12}$ alkenyl, or substituted or unsubstituted $C_{2-12}$ alkynyl, and preferably substituted or unsubstituted $C_{1-12}$ alkyl, more preferably unsubstituted $C_{1-8}$ alkyl. A can be a divalent substituted or unsubstituted $C_{1-36}$ alkyl whose chain is interrupted by one or more units of substituted or unsubstituted $C_{6-12}$ aryl or one or more units of substituted or unsubstituted $C_{6-12}$ heteroaryl. A can be a substituted or unsubstituted $C_{6-12}$ heteroaryl. A can be an ether such as —O—(—$R_4$—O—)$_n$— wherein each $R_4$ is independently a divalent $C_{1-8}$ alkyl or divalent $C_{3-12}$ cycloalkyl, and n is 1 to 12, specifically 1 to 10, and more specifically 1 to 6.

In a specific embodiment, $R_1$ and $R_2$ are each independently substituted or unsubstituted $C_{1-12}$ alkyl, for example substituted or unsubstituted $C_{1-8}$ alkyl, specifically unsubstituted $C_{1-6}$ alkyl, and preferably $R_1$ and $R_2$ are both methyl; and m is 0.

In another specific embodiment, $R_1$ and $R_2$ are each independently substituted or unsubstituted $C_{1-12}$ alkyl, for example substituted or unsubstituted $C_{1-8}$ alkyl; m is 1; and A is substituted or unsubstituted $C_{1-12}$ alkyl, substituted or unsubstituted $C_{3-12}$ cycloalkyl, substituted or unsubstituted $C_{6-12}$ aryl, substituted or unsubstituted $C_{3-6}$ heteroalkyl, substituted or unsubstituted $C_{2-12}$ alkenyl, or substituted or unsubstituted $C_{2-12}$ alkynyl.

In still another specific embodiment, $R_1$ and $R_2$ are each independently unsubstituted $C_{1-6}$ alkyl, and preferably $R_1$ and $R_2$ are both methyl; m is 1; and A is substituted or unsubstituted $C_{1-12}$ alkyl, more preferably unsubstituted $C_{1-8}$ alkyl.

Specific examples of the organotin ester polymers include poly(dimethyltin oxalate), poly(dimethyltin malonate), poly(dimethyltin succinate), poly(dimethyltin glutarate), poly(dimethyltin adipate), poly(dimethyltin pimelate), poly(dimethyltin suberate), poly(dimethyltin azelate), poly(dimethyltin sebacate), poly(dimethyltin dodecanediate), poly(dimethyltin 3,3-dimethylglutarate), poly(dimethyltin poly(ethylene glycol) bis(carboxylate-250), poly(dimethyltin terephthalate), poly(dimethyltin isophthalate), poly(dimethyltin 2,5-pyridinedicarboxylate), poly(dimethyltin 2,6-pyridinedicarboxylate), poly(dimethyltin 2,5-thiophenedicarboxylate), poly(dimethyltin L-tartrate), poly(dimethyltin D-tartrate), poly(dimethyltin DL-tartrate), poly(dimethyltin 50/50 L-tartrate/glutarate), poly(dimethyltin 50/50 D-tartrate/glutarate), poly(dimethyltin 50/50 DL-tartrate/glutarate), or combinations comprising at least one of the foregoing. In an embodiment, a blend comprises two or more organotin ester polymers.

Any of the foregoing polymers can be further coordinated with a high dielectric constant ligand, preferably a small, high dielectric constant molecular ligand, such as water; ammonia; hydrogen sulfide; an alcohol such as methanol, ethanol, propanol, and the like; an amine such as methylamine, ethylamine, propylamine, and the like; or a thiol such as methane thiol, ethane thiol, and the like.

The organotin ester polymers can be manufactured by the reaction of an organic dicarboxy compound, preferably a dicarboxylic acid, with a diorganotin dihalide.

The dicarboxy compounds include dicarboxylic acids and reactive derivatives thereof, for example acyl halides such as acyl chlorides, esters, and the like. Specific examples of organic dicarboxylic acids are oxalic acid, malonic acid, succinic acid, glutaric acid, adipic acid, pimelic acid, suberic acid, azelaic acid, sebacic acid, dodecanedioic acid, dimethylglutaric acid (e.g. 2,2-isomer, 3,3-isomer, 2,4-isomer), poly(ethylene glycol) bis(carboxymethyl) ether-250, terephthalic acid, isophthalic acid, 2,5-pyridinedicarboxylic acid, 2,6-pyridinedicarboxylic acid, 2,5-thiophenedicarboxylic acid, L-tartaric acid, D-tartaric acid, DL-tartrate) to mention a few. Combinations comprising at least one of the foregoing can be used.

Examples of diorganotin dihalides include dialkyl tin halides such as dimethyltin dichloride, dibutyltin dichloride, dioctyltin dichloride, and didodecyltin dichloride, preferably dimethyltin dichloride. Combinations comprising at least one of the foregoing can be used.

The process for producing the organotin ester polymer comprises contacting the dicarboxy compound and the diorganotin dihalide, optionally in a solvent, optionally in the presence of a catalyst, at a temperature and pressure effective to produce the organotin ester polymer.

A molar excess of the dicarboxy compound, based on diorganotin dihalide, can be used, for example, the molar excess of organic dicarboxy compound, based on moles diorganotin dihalide, is 5%, 10%, 15%, and 20%.

Further according to the process, the dicarboxy compound can be dissolved in water with a base to provide an aqueous solution, for example combined with greater than or equal to 2.01 equivalents, with respect to the dicarboxylic acid, of a base. The base can also be added in amounts of 2.05, 2.08, 2.1, 2.15, 2.2, 2.3, and 2.5 equivalents with respect to the dicarboxy compound. Exemplary bases are hydroxides and oxides of alkali and alkaline earth metals, preferably lithium hydroxide, sodium hydroxide, potassium hydroxide, magnesium hydroxide, calcium hydroxide, more preferably sodium hydroxide, potassium hydroxide, and the like, or combinations comprising at least one of the foregoing.

Contacting the dicarboxy compound or aqueous solution thereof and the diorganotin dihalide can be in the presence of a solvent. Suitable solvents are water, tetrahydrofuran, dioxane, acetone, ethyl acetate, and the like, or combinations comprising at least one of the foregoing.

Contacting the organic dicarboxy compound, preferably the dicarboxylic acid and dialkytin dichloride leads to a precipitate. The precipitate can be filtered off, optionally washed with additional solvent water, and dried to remove any residual solvent and water. Drying can be under vacuum, or at atmospheric pressure. In one embodiment, drying is at a temperature in the range of 40 to 200° C., preferably 60 to 150° C. Drying can also be for a period of 1 to 50 hours, preferably 5 to 30 hours.

The polymers, including polymers made by the foregoing processes, can have a number average molecular weight ($M_n$) of 20,000 g mol$^{-1}$ or greater, specifically in the range of 20,000 to 150,000 g mol$^{-1}$, preferably 30,000 to 100,000 g mol$^{-1}$, more preferably 40,000 to 80,000 g mol$^{-1}$.

In addition, the polymers, including polymers made by the foregoing processes, can have a number of advantageous properties, including high static dielectric constant, high energy bandgap, and high-temperature stability.

The static dielectric constant, $\in$, is an essential factor in assessing the effectiveness of a capacitor dielectric. It can be a measure of a substance's ability to insulate charges from each other. Higher static dielectric constant can mean higher polarity for the material, and greater ability to stabilize charges, thereby acting as a better dielectric/insulator. In some embodiments, the compositions exhibit a dielectric constant ($\in$) greater than or equal to 4.5, preferably greater than or equal to 5, more preferably greater than or equal to 5.2, most preferably greater than or equal to 5.3.

Energy band gap too is an important factor in determining the efficacy of an insulator. It is known as an energy range in a solid where no electron states can exist. Generally, substances with higher energy band gaps can act as better insulators. In an embodiment, the compositions are characterized by an energy band gap ($E_g$) of greater than or equal to 4.4 eV, preferably of greater than or equal to 4.5 eV, more preferably of greater than or equal to 4.6 eV, most preferably of greater than or equal to 4.7 eV.

In an embodiment, the compositions display a thermogravimetric analysis (TGA) onset temperature of greater than or equal to 200° C., preferably of greater than or equal to 210° C., more preferably of greater than or equal to 215° C.

In a specific embodiment, the organotin ester polymers exhibit high dielectric constant, $\in$ greater than or equal to 5.3, with low dielectric loss for some polymers, i.e., less than or equal to 10-2, and large band gaps, Eg≥4.6 eV.

The organotin ester polymers can be used as an insulating dielectric material in a variety of articles, especially electronic articles. Examples of these articles include capacitors, field effect transistors, electromechanical systems, printed circuits, and photovoltaics.

The organotin ester polymers provide a number of advantages in these applications. In capacitors, their use can reduce the size of the capacitor bank, and increase the temperature for operation possibly avoiding current techniques for cooling. The same size capacitor bank would store energy equivalent to the multiple of the dielectric constant of the organometallic polymer in comparison to known polymers such as biaxially oriented polypropylene (BOPP). For example, BOPP has a dielectric constant of about 2.2. For organotin ester polymers having a dielectric constant of 8.8, then the same amount of material as BOPP would store 4 times more energy. In gate dielectrics for flexible display transistors, the organotin ester polymers are flexible, and are thermoplastic and thus could be printed. The organotin ester polymers having a high refractive index could be used for refractive index matching for optics applications to reduce Fresnel reflective losses in displays, eyewear, or windows.

The following examples further illustrate the invention, and are for illustrative purposes only and are not to be construed as limiting in any manner.

EXAMPLES

Instrumentation and Methods

A Cary 5000 UV-vis-NIR (ultraviolet-visible-near infrared) spectrophotometer was used to measure energy band gaps with the absorption spectra being collected from 175-800 nm.

For energy band gap ($E_g$) measurements, a 10 wt % solution of corresponding poly(dimethyltin ester) was casted onto a quartz glass slide and dried in vacuo at 115° C. to remove residual solvent. The UV-vis spectrum was recorded from 175-800 nm and the onset wavelengths of absorption $\lambda_{onset}$, were determined. $E_g$ was then calculated from Planck's relation.

Dielectric constant measurements were performed either using an IMASS Time Domain Dielectric Spectrometer (TDDS) or Agilent 4284A Precision LCR meter averaging 5 measurements of the capacitance and dissipation over a frequency range of 20 Hz to 1 MHz.

Solution $^1$H NMR was performed on a Bruker DMX 500 high resolution digital NMR spectrometer. All chemical shifts were referenced to acetic acid-d$_4$ (δ=2.04 ppm).

For determination of number average molecular weight ($M_n$) by $^1$H-NMR, first the integral per proton was calculated from the sum of the acid chain ends divided by the number of protons from the chain end, 4. Then the number of repeat units, n, was determined by dividing the integral of the triplet at δ=2.457 ppm by the number of protons, 4, and dividing by the integral per proton. The $M_n$ was then calculated from the sum of the $FW_{chain\ end}+(FW_{repeat\ unit})$ (n).

Thermogravimetric Analysis (TGA) was performed using a TA instruments TGA Q500 at a heating rate of 10° C. min$^{-1}$ under nitrogen atmosphere.

Synthesis Procedure for Organotin Ester Polymers

Poly(dimethyltin oxalate) (p(DMTOx))

To a round bottom flask was added 2.130 g (16.9 mmol) oxalic acid dihydrate, 1.4823 g (37.1 mmol) NaOH, and 80 mL of water and stirred rapidly. To an Erlenmeyer flask was added 3.6558 g (16.6 mmol) of Me$_2$SnCl$_2$ and 25 ml of THF. After dissolution of the Me$_2$SnCl$_2$ the organic phase is rapidly added to the aqueous phase. The precipitate is filtered and purified by washing with 50 mL portions of both tetrahydrofuran and distilled water, then dried in vacuo at 115° C. for 20 hours, to yield 2.9604 g (75.1%) of polymer.

Poly(dimethyltin malonate) (p(DMTMal))

To a round bottom flask was added 2.2893 g (22.0 mmol) malonic acid, 1.8598 g (46.5 mmol) NaOH, and 20 mL of water and stirred rapidly. To an Erlenmeyer flask was added 4.7789 g (21.8 mmol) of Me$_2$SnCl$_2$ and 20 ml of THF. After dissolution of the Me$_2$SnCl$_2$ the organic phase is rapidly added to the aqueous phase. The precipitate is filtered and purified as described above to yield 2.4178 g (44.3%) of polymer.

Poly(dimethyltin succinate) (p(DMTSuc))

To a round bottom flask was added 3.5673 g (22.0 mmol) succinic acid disodium salt and 20 mL of water and stirred rapidly. To an Erlenmeyer flask was added 4.7756 g (21.7 mmol) of Me$_2$SnCl$_2$ and 20 ml of THF. After dissolution of the Me$_2$SnCl$_2$ the organic phase is rapidly added to the aqueous phase. The precipitate is filtered, and purified and dried as described above to yield 3.8887 g (71.3%) of polymer. ¹H-NMR (500 MHz, acetic acid-d₄, δ) 2.69 (s, 4H; CH₂), 0.97 (s, 6H; CH₃).

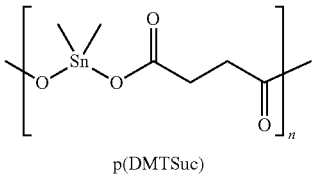

p(DMTSuc)

Poly(dimethyltin glutarate) (p(DMTGlu))

To a round bottom flask was added 2.9070 g (22.0 mmol) glutaric acid, 1.8874 g (47.2 mmol) NaOH, and 20 mL of water and stirred rapidly. To an Erlenmeyer flask was added 4.7763 g (21.7 mmol) of Me₂SnCl₂ and 20 ml of THF. After dissolution of the Me₂SnCl₂ the organic phase is rapidly added to the aqueous phase. The precipitate is filtered, and purified and dried as described above to yield 4.0570 g (66.9%) of polymer. ¹H NMR (500 MHz, acetic acid-d₄, δ) 2.46 (t, J=7.5 Hz, 4H; CH₂), 1.93 (quintet, J=7 Hz, 2H; CH₂), 0.98 (s, 6H; CH₃).

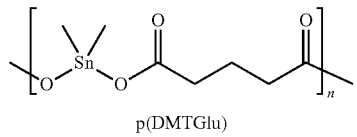

p(DMTGlu)

Poly(dimethyltin adipate) (p(DMTAdi))

To a round bottom flask was added 3.2152 g (22.0 mmol) adipic acid, 1.8400 g (46.0 mmol) NaOH, and 20 mL of water and stirred rapidly. To an Erlenmeyer flask was added 4.7660 g (21.7 mmol) of Me₂SnCl₂ and 20 ml of THF. After dissolution of the Me₂SnCl₂ the organic phase is rapidly added to the aqueous phase. The precipitate is filtered, and purified and dried as described above to yield 4.6100 g (72.6%) of polymer. ¹H NMR (500 MHz, acetic acid-d₄, δ) 2.40 (t, J=6.5 Hz, 4H; CH₂), 1.68 (quintet, J=3.5 Hz, 4H; CH₂), 0.97 (s, 6H; CH₃).

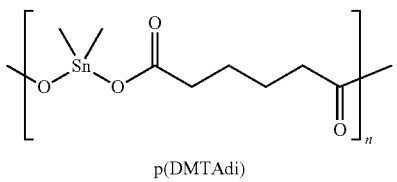

p(DMTAdi)

Poly(dimethyltin pimelate) (p(DMTPim))

To a round bottom flask was added 3.5246 g (22.0 mmol) pimelic acid, 1.8852 g (47.1 mmol) NaOH, and 20 mL of water and stirred rapidly. To an Erlenmeyer flask was added 4.7886 g (21.8 mmol) of Me₂SnCl₂ and 20 ml of THF. After dissolution of the Me₂SnCl₂ the organic phase is rapidly added to the aqueous phase. The precipitate is filtered, and purified and dried as described above to yield 3.9390 g (71.2%) of polymer. ¹H NMR (500 MHz, acetic acid-d₄, δ) 2.38 (t, J=7.5 Hz, 4H; CH₂), 1.65 (quintet, J=7.5 Hz, 4H; CH₂), 1.40 (quintet, J=7.5 Hz, 2H; CH₂), 0.97 (s, 6H; CH₃).

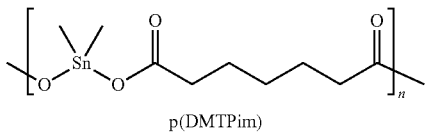

p(DMTPim)

Poly(dimethyltin suberate) (p(DMTSub))

To a round bottom flask was added 3.8348 g (22.0 mmol) suberic acid, 1.8496 g (46.2 mmol) NaOH, and 20 mL of water and stirred rapidly. To an Erlenmeyer flask was added 4.7755 g (21.7 mmol) of Me₂SnCl₂ and 20 ml of THF. After dissolution of the Me₂SnCl₂ the organic phase is rapidly added to the aqueous phase. The precipitate is filtered, and purified and dried as described above to yield 4.6767 g (67.0%) of polymer. ¹H NMR (500 MHz, acetic acid-d₄, δ) 2.37 (t, J=7 Hz, 4H; CH₂), 1.64 (quintet, J=7 Hz, 4H; CH₂), 1.37 (quintet, J=3.5 Hz, 4H; CH₂), 0.98 (s, 6H; CH₃).

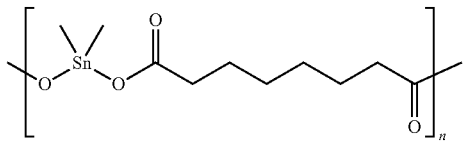

p(DMTSub)

Poly(dimethyltin azelate) (p(DMTAze))

To a round bottom flask was added 4.1454 g (22.0 mmol) azelaic acid, 1.8366 g (45.9 mmol) NaOH, and 20 mL of water and stirred rapidly. To an Erlenmeyer flask was added 4.7740 g (21.7 mmol) of Me₂SnCl₂ and 20 ml of THF. After dissolution of the Me₂SnCl₂ the organic phase is rapidly added to the aqueous phase. The precipitate is filtered, and purified as described above to yield 3.8174 g (52.4%) of polymer. ¹H NMR (500 MHz, acetic acid-d₄, δ) 2.37 (t, J=7.5 Hz, 4H; CH₂), 1.63 (quintet, J=7 Hz, 4H; CH₂), 1.36 (m, 6H; CH₂), 0.98 (s, 6H; CH₃).

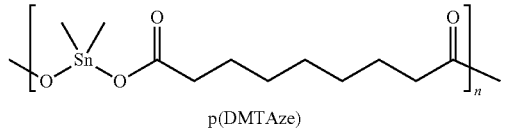

p(DMTAze)

Poly(dimethyltin sebacate) (p(DMTSeb))

To a round bottom flask was added 4.4579 g (22.0 mmol) sebacic acid, 1.8865 g (47.2 mmol) NaOH, and 40 mL of water and stirred rapidly. To an Erlenmeyer flask was added 4.7728 g (21.8 mmol) of Me₂SnCl₂ and 20 ml of THF. After dissolution of the Me₂SnCl₂ the organic phase is rapidly added to the aqueous phase. The precipitate is filtered, and purified and dried as described above to yield 4.9809 g (65.7%) of polymer. ¹H NMR (500 MHz, acetic acid-d₄, δ) 2.36 (t, J=7.5 Hz, 4H; CH₂), 1.63 (quintet, J=7 Hz, 4H; CH₂), 1.34 (m, 8H; CH₂), 0.98 (s, 6H; CH₃).

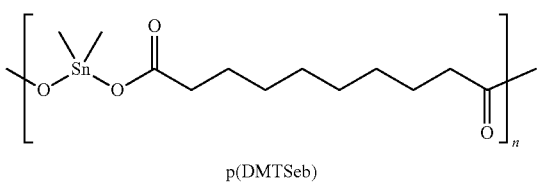

p(DMTSeb)

Poly(dimethyltin dodecanediate) (p(DMTDec))

To a round bottom flask was added 5.0678 g (21.8 mmol) 1,12-dodecanedioic acid, 1.9507 g (48.8 mmol) NaOH, and 60 mL of water and stirred rapidly. To an Erlenmeyer flask was added 4.7710 g (21.7 mmol) of $Me_2SnCl_2$ and 60 ml of THF. After dissolution of the $Me_2SnCl_2$ the organic phase is rapidly added to the aqueous phase. The precipitate is filtered, and purified and dried as described above to yield 5.8006 g (61.9%) of polymer. $^1$H NMR (500 MHz, acetic acid-$d_4$, δ) 2.36 (t, J=7.5 Hz, 4H; $CH_2$), 1.63 (quintet, J=7 Hz, 4H; $CH_2$), 1.34 (m, 12H; $CH_2$), 0.98 (s, 6H; $CH_3$).

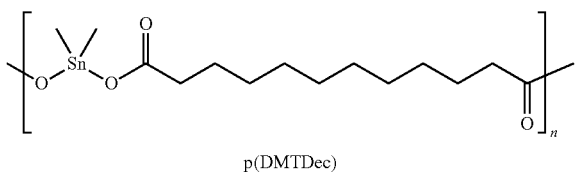

p(DMTDec)

Poly(dimethyltin 3,3-dimethylglutarate) (p(DMT 3,3-DMG))

To a round bottom flask was added 2.4747 g (15.5 mmol) 3,3-dimethylglutaric acid, 1.4224 g (35.6 mmol) NaOH, and 20 mL of water and stirred rapidly. To an Erlenmeyer flask was added 3.3694 g (15.3 mmol) of $Me_2SnCl_2$ and 18 ml of THF. After dissolution of the $Me_2SnCl_2$ the organic phase is rapidly added to the aqueous phase. The precipitate is filtered and purified as described above to yield 1.8733 g (39.8%) of polymer. $^1$H NMR (500 MHz, acetic acid-$d_4$, δ): 2.50 (s, 4H; $CH_2$), 1.16 (s, 6H; $CH_3$), 0.98 (s, 6H; $CH_3$); IR (KBr): ν=3440 (s; OH), 2960 (vs; CH), 2929 (vs; CH), 1672 (m), 1635 (s; $ν_{as}$(C=O)), 1618 (s), 1560 (vs), 1471 (m), 1408 (m), 1365 (s), 1258 (m), 1179 (m), 1111 (w), 793 (s), 637 (m), 573 (w), 525 (w), 500 $cm^{-1}$ (m); TGA (10° C. $min^{-1}$): $N_2$ (onset): 257° C.; $M_n$($^1$H NMR): 56,838.89 g $mol^{-1}$.

Poly(dimethyltin poly(ethylene glycol) bis(carboxylate-250) (p(DMT pEGBC-250))

To a round bottom flask was added 55.2225 g (220.9 mmol) poly(ethylene glycol) bis(carboxymethyl) ether-250, 18.5873 g (464.7 mmol) NaOH, and 340 mL of water and stirred rapidly. To an Erlenmeyer flask was added 48.0355 g (218.7 mmol) of $Me_2SnCl_2$ and 325 ml of THF. After dissolution of the $Me_2SnCl_2$ the organic phase is rapidly added to the aqueous phase. The precipitate is filtered and purified as described above to yield 39.5835 g (45.6%) of polymer. IR (KBr): ν=3502 (s; OH), 3007 (w; CH), 2908 (s; CH), 1660 (s; $ν_{as}$(C=O)), 1469 (m), 1421 (m), 1374 (vs), 1354 (vs), 1327 (vs), 1246 (s), 1179 (m), 1125 (vs), 1106 (vs), 1059 (m), 966 (s), 933 (m), 909 (s), 791 (s), 714 (s), 624 (vs), 592 (vs), 523 (w), 473 $cm^{-1}$ (w); TGA (10° C. $min^{-1}$): $N_2$ (onset): 231° C.

Poly(dimethyltin terephthalate) (p(DMTTer))

To a round bottom flask was added 3.6636 g (22.1 mmol) terephthalic acid, 1.8731 g (46.8 mmol) NaOH, and 40 mL of water and stirred rapidly. To an Erlenmeyer flask was added 4.7723 g (21.7 mmol) of $Me_2SnCl_2$ and 20 ml of THF. After dissolution of the $Me_2SnCl_2$ the organic phase is rapidly added to the aqueous phase. The precipitate is filtered and purified as described above to yield 5.0230 g (73.9%) of polymer. IR (KBr): ν=3442 (m; OH), 2927 (w; CH), 1637 (vs; $ν_{as}$(C=O)), 1572 (vs), 1507 (s), 1407 (vs), 1380 (s), 1365 (vs), 1196 (w), 1142 (m), 1104 (w), 1017 (m), 883 (m), 857 (m), 796 (s), 743 (vs), 642 (s), 586 (w), 557 (s), 502 $cm^{-1}$ (s); TGA (10° C. $min^{-1}$): $N_2$ (onset): 311° C.

Poly(dimethyltin isophthalate) (p(DMTIso))

To a round bottom flask was added 3.6587 g (22.0 mmol) isophthalic acid, 1.8466 g (46.2 mmol) NaOH, and 20 mL of water and stirred rapidly. To an Erlenmeyer flask was added 4.7713 g (21.7 mmol) of $Me_2SnCl_2$ and 20 ml of THF. After dissolution of the $Me_2SnCl_2$ the organic phase is rapidly added to the aqueous phase. The precipitate is filtered and purified as described above to yield 5.8355 g (85.9%) of polymer. IR (KBr): ν=3440 (m; OH), 3066 (w; Ar CH), 1609 (vs; $ν_{as}$(C=O)), 1560 (vs), 1478 (w), 1372 (vs), 1315 (s), 1275 (w), 1157 (m), 1103 (w), 1077 (w), 947 (w), 858 (m), 802 (m), 736 (vs), 667 (w), 630 (m), 590 (m), 569 (m), 503 (w), 463 (m), 446 $cm^{-1}$ (s); TGA (10° C. $min^{-1}$): $N_2$ (onset): 331° C.

Poly(dimethyltin 2,5-pyridinedicarboxylate) (p(DMT 2,5-DPA))

To a round bottom flask was added 3.6758 g (22.0 mmol) 2,5-pyridinedicarboxylic acid, 1.8562 g (46.4 mmol) NaOH, and 30 mL of water and stirred rapidly. To an Erlenmeyer flask was added 4.7802 g (21.8 mmol) of $Me_2SnCl_2$ and 20 ml of THF. After dissolution of the $Me_2SnCl_2$ the organic phase is rapidly added to the aqueous phase. The precipitate is filtered and purified as described above to yield 5.1131 g (74.9%) of polymer. IR (KBr): ν=3421 (s; OH), 2921 (w; CH), 1691 (s), 1614 (vs; $ν_{as}$(C=O)), 1483 (m), 1395 (vs), 1332 (vs), 1275 (w), 1265 (s), 1166 (m), 1146 (m), 1040 (s), 845 (m), 801 (s), 757 (s), 686 (m), 657 (m), 583 (m), 537 $cm^{-1}$ (m); TGA (10° C. $min^{-1}$): $N_2$ (onset): 306° C.

Poly(dimethyltin 2,6-pyridinedicarboxylate) (p(DMT 2,6-DPA))

To a round bottom flask was added 3.7877 g (22.7 mmol) 2,6-pyridinedicarboxylic acid, 1.9675 g (49.2 mmol) NaOH, and 30 mL of water and stirred rapidly. To an Erlenmeyer flask was added 4.9212 g (22.4 mmol) of $Me_2SnCl_2$ and 20 ml of THF. After dissolution of the $Me_2SnCl_2$ the organic phase is rapidly added to the aqueous phase. The precipitate is filtered and purified as described above to yield 6.3576 g (90.4%) of polymer. IR (KBr): ν=3435 (m; OH), 3062 (m; Ar CH), 3017 (m; Ar CH), 2925 (w; CH), 1672 (vs), 1614 (vs; $ν_{as}$(C=O)), 1587 (vs), 1570 (vs), 1475 (w), 1430 (s), 1396 (s), 1344 (s), 1275 (s), 1179 (s), 1071 (s), 1029 (s), 811 (s), 768 (s), 740 (vs), 690 (m), 673 (m), 567 (m), 429 $cm^{-1}$ (m); TGA (10° C. $min^{-1}$): $N_2$ (onset): 303° C.

Poly(dimethyltin 2,5-thiophenedicarboxylate) (p(DMT 2,5-TDC))

To a round bottom flask was added 3.7921 g (22.0 mmol) 2,5-thiophenedicarboxylic acid, 1.8492 g (46.2 mmol) NaOH, and 40 mL of water and stirred rapidly. To an Erlenmeyer flask was added 4.8361 g (22.0 mmol) of $Me_2SnCl_2$ and 20 ml of THF. After dissolution of the $Me_2SnCl_2$ the organic phase is rapidly added to the aqueous phase. The precipitate is filtered and purified as described above to yield 4.6797 g (66.7%) of polymer. IR (KBr): ν=3434 (m; OH), 3090 (w; Ar CH), 3005 (w; Ar CH), 2920 (m; CH), 1618 (s; $ν_{as}$(C=O)), 1569 (vs), 1529 (vs), 1471 (m), 1395 (vs), 1348 (vs), 1301 (vs), 1200 (w), 1109 (w), 1026 (w), 845 (w), 792 (s), 771 (s), 679 (w), 648 (s), 580 (m), 495 (s), 472 cm$^{-1}$ (s); TGA (10° C. min$^{-1}$): N$_2$ (onset): 324° C.

Poly(dimethyltin L-tartrate) (p(DMT L-Tar))

To a round bottom flask was added 3.3085 g (22.0 mmol) L-tartaric acid, 4.4830 g (44.3 mmol) triethylamine, and 20 mL of water and stirred rapidly. To an Erlenmeyer flask was added 4.8221 g (21.9 mmol) of Me$_2$SnCl$_2$ and 20 ml of THF. After dissolution of the Me$_2$SnCl$_2$ the organic phase is rapidly added to the aqueous phase. The precipitate is filtered and purified as described above to yield 2.7202 g (41.7%) of polymer. IR (KBr): ν=3423 (s; OH), 3008 (w; CH), 2923 (m; CH), 2827 (w), 1651 (s), 1616 (s; ν$_{as}$(C=O)), 1577 (s), 1505 (m), 1365 (s), 1341 (s), 1301 (vs), 1291 (m), 1250 (w), 1203 (m), 1107 (s), 1084 (m), 1066 (s), 947 (s), 813 (s), 745 (m), 661 (m), 576 (m), 557 (s), 523 (m), 452 (w), 418 cm$^{-1}$ (w); TGA (10° C. min$^{-1}$): N$_2$ (onset): 243° C.

Poly(dimethyltin D-tartrate) (p(DMT D-Tar))

To a round bottom flask was added 3.3178 g (22.1 mmol) D-tartaric acid, 4.4789 g (44.3 mmol) triethylamine, and 20 mL of water and stirred rapidly. To an Erlenmeyer flask was added 4.8088 g (21.9 mmol) of Me$_2$SnCl$_2$ and 20 ml of THF. After dissolution of the Me$_2$SnCl$_2$ the organic phase is rapidly added to the aqueous phase. The precipitate is filtered and purified as described above to yield 2.3893 g (36.8%) of polymer. IR (KBr): ν=3420 (s; OH), 3008 (w; CH), 2923 (m; CH), 2827 (w), 1650 (s), 1616 (s; ν$_{as}$(C=O)), 1576 (s), 1506 (m), 1365 (s), 1341 (s), 1291 (s), 1250 (m), 1203 (m), 1107 (s), 1084 (m), 1066 (s), 947 (s), 812 (s), 746 (s), 661 (m), 576 (m), 557 (s), 454 (w), 420 cm$^{-1}$ (w); TGA (10° C. min$^{-1}$): N$_2$ (onset): 231° C.

Poly(dimethyltin DL-tartrate) (p(DMT DL-Tar))

To a round bottom flask was added 3.3091 g (22.0 mmol) DL-tartaric acid, 4.4841 g (44.3 mmol) triethylamine, and 20 mL of water and stirred rapidly. To an Erlenmeyer flask was added 4.8358 g (22.0 mmol) of Me$_2$SnCl$_2$ and 20 ml of THF. After dissolution of the Me$_2$SnCl$_2$ the organic phase is rapidly added to the aqueous phase. The precipitate is filtered and purified as described above to yield 3.6828 g (56.4%) of polymer. IR (KBr): ν=3442 (s; OH), 3008 (w; CH), 2923 (m; CH), 2831 (m), 1655 (vs), 1615 (s; ν$_{as}$(C=O)), 1575 (s), 1506 (s), 1365 (s), 1345 (s), 1291 (s), 1203 (s), 1109 (s), 1061 (s), 946 (s), 813 (s), 760 (s), 665 (m), 575 (m), 559 (s), 454 (w), 419 cm$^{-1}$ (w); TGA (10° C. min$^{-1}$): N$_2$ (onset): 251° C.

Poly(dimethyltin 50/50 L-tartrate/glutarate) (p(DMT 50/50 L-Tar/Glu))

To a round bottom flask was added 1.6516 g (11.0 mmol) L-tartaric acid, 1.4539 g (11.0 mmol) glutaric acid, 4.4800 g (44.3 mmol) triethylamine, and 20 mL of water and stirred rapidly. To an Erlenmeyer flask was added 4.8348 g (22.0 mmol) of Me$_2$SnCl$_2$ and 20 ml of THF. After dissolution of the Me$_2$SnCl$_2$ the organic phase is rapidly added to the aqueous phase. The precipitate is filtered and purified as described above to yield 4.7563 g (75.1%) of polymer. IR (KBr): ν=3440 (s; OH), 3011 (w; CH), 2977 (w; CH), 2926 (m; CH), 2853 (w), 1696 (s), 1643 (s; ν$_{as}$(C=O)), 1584 (s), 1533 (s), 1459 (s), 1387 (s), 1328 (s), 1286 (m), 1257 (m), 1204 (s), 1109 (s), 1067 (s), 945 (s), 818 (s), 741 (s), 694 (w), 649 (m), 574 (m), 559 (s), 525 (m), 420 cm$^{-1}$ (w); TGA (10° C. min$^{-1}$): N$_2$ (onset): 230° C.

Poly(dimethyltin 50/50 D-tartrate/glutarate) (p(DMT 50/50 D-Tar/Glu))

To a round bottom flask was added 1.6788 g (11.2 mmol) D-tartaric acid, 1.4594 g (11.0 mmol) glutaric acid, 4.5283 g (44.8 mmol) triethylamine, and 20 mL of water and stirred rapidly. To an Erlenmeyer flask was added 4.8056 g (219 mmol) of Me$_2$SnCl$_2$ and 20 ml of THF. After dissolution of the Me$_2$SnCl$_2$ the organic phase is rapidly added to the aqueous phase. The precipitate is filtered and purified as described above to yield 1.9180 g (30.5%) of polymer. IR (KBr): ν=3434 (s; OH), 2927 (m; CH), 2855 (w), 1697 (s), 1652 (vs; ν$_{as}$(C=O)), 1533 (vs), 1418 (m), 1386 (m), 1340 (w), 1318 (m), 1296 (w), 1256 (w), 1200 (s), 1109 (s), 1067 (s), 961 (w), 945 (s), 819 (s), 746 (m), 694 (w), 651 (m), 574 (m), 560 (s), 525 (m), 423 cm$^{-1}$ (w); TGA (10° C. min$^{-1}$): N$_2$ (onset): 231° C.

Poly(dimethyltin 50/50 DL-tartrate/glutarate) (p(DMT 50/50 DL-Tar/Glu))

To a round bottom flask was added 1.6533 g (11.0 mmol) DL-tartaric acid, 1.4546 g (11.0 mmol) glutaric acid, 4.4742 g (44.2 mmol) triethylamine, and 20 mL of water and stirred rapidly. To an Erlenmeyer flask was added 4.8383 g (22.0 mmol) of Me$_2$SnCl$_2$ and 20 ml of THF. After dissolution of the Me$_2$SnCl$_2$ the organic phase is rapidly added to the aqueous phase. The precipitate is filtered and purified as described above to yield 5.1282 g (80.9%) of polymer. IR (KBr): ν=3432 (s; OH), 3011 (w), 2967 (w), 2924 (m; CH), 2847 (w), 1647 (vs; ν$_{as}$(C=O)), 1587 (vs), 1457 (s), 1330 (s), 1287 (m), 1273 (m), 1258 (m), 1204 (s), 1123 (s), 1067 (s), 945 (s), 798 (s), 735 (s), 645 (m), 573 (m), 554 (s), 524 (m), 423 cm$^{-1}$ (w); TGA (10° C. min$^{-1}$): N$_2$ (onset): 258° C.

Dielectric constant (∈), energy band gap (E$_g$), TGA onset temperature (Onset temp), and average molecular weight (M$_n$) for organotin ester polymers are summarized in Table 1.

TABLE 1

Dielectric constant, energy band gap, TGA onset temperature, and average molecular weight for organotin ester polymers

| organotin ester polymer | ε[a] | E$_g$[b] [eV] | Onset temp [° C.] | M$_n$ [g mol$^{-1}$] |
|---|---|---|---|---|
| p(DMTOx) | 8.70 | — | 256 | |
| p(DMTMal) | 5.85 | 4.825[c] | 216 | |
| p(DMTSuc) | 6.20 | — | 238 | 65,112 |
| p(DMTGlu) | 5.77 | 4.697[d] | 265 | 68,991 |
| P(DMTAdi) | — | — | 251 | 70,302 |
| p(DMTPim) | 6.34 | 4.825[d] | 260 | 70,719 |
| p(DMTSub) | 6.64 | 6.739[e] | 242 | 75,494 |
| p(DMTAze) | 6.21 | 5.391[d] | 248 | 79,945 |
| p(DMTSeb) | 5.28 | 4.806[d] | 240 | 88,004 |
| p(DMTDec) | 5.35 | 5.439[d] | 225 | 93,910 |

[a]Average value over 1-1000 Hz;
[b]Determined by UV-vis;
[c]3:1 (v:v) hexafluoroisopropanol:chloroform solution;
[d]m-cresol solution;
[e]2/1 (v/v) m-cresol/2-dichloroethane The results show that compositions comprising an organotin ester polymer have the advantage of displaying a dielectric constant (∈) of greater than or equal to 4.5 and an energy band gap (E$_g$) of greater than or equal to 4.4 eV while maintaining a number average molecular weight (M$_n$) in the range of 40,000 to 200,000 g mol$^{-1}$, and a thermogravimetric analysis (TGA) onset temperature of greater than or equal to 200° C.

Structural Motifs and Characterization

Figure 1B:
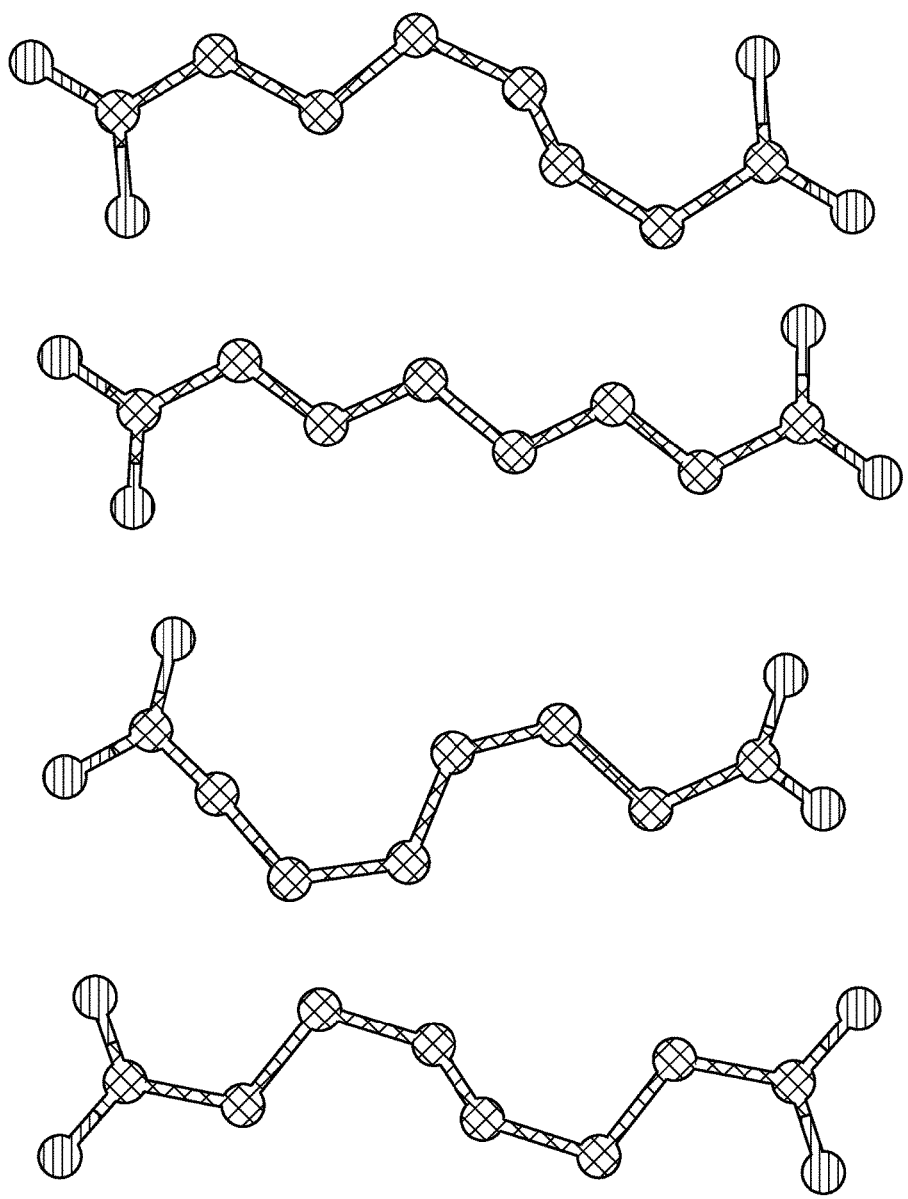
FIG. 1B shows four (out of numerous) folding geometries of the chains of methylene groups acting as organic linkers in p(DMTSub).
Figure 1B:
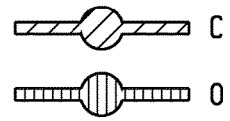

It has been reported that the coordination number of a tin atom in organotin compounds can be four, five, six, or seven. (C. E. Carraher, in *Macromolecules Containing Metal and Metal-Like Elements: Group IVA Polymers*, Vol. 4 (Eds: A. S. Abd-El-Aziz, C. E. Carraher, C. U. Pittman, M. Zeldin), Wiley, Hoboken, N.J., USA 2005, Ch. 10.) In the low-energy structures predicted for p[DMT(CH$_2$)$_n$], the central tin atom of each dimethyltin dicarboxylate group are coordinated by six atoms, including two carbon atoms from two methyl groups and four oxygen atoms from the surrounding carboxyl groups. Based on the arrangement of the four Sn—O bonds, the predicted structures are categorized into three structural motifs, α, β and γ, which are illustrated in FIG. 1.

Motifs α and β (also called intra-chain and inter-chain) were previously hypothesized to exist in organotin compounds. In motif α (intra-chain), the two carboxyl groups from the same repeat unit are bonded to the central tin atom by four Sn—O bonds, two of them are rather long ($\geq 2.5$ Å) and weak while the other two are short and strong (about 2.1 Å). Consequently, motif α is characterized by one-dimensional chains held together by the long-range dispersion interactions. In a number of organotin compounds, e.g., organotin carboxylates, dibutanidobis(2,4,6-trimethylbenzoato)tin, and di-n-butyl-(glutarato)-tin(IV), this motif has been reported. A quantitative examination reveals that the characteristic bond lengths and bond angles predicted for p[DMT(CH$_2$)$_n$] (specifically for p(DMTGlu) agree very well with those measured in the related compounds. In the so-called motif β (inter-chain), four Sn—O bonds link the central tin atom with four different carboxyl groups, two of them belonging to the same chain (repeat unit) while the other two bonds come from other chains. Therefore, motif β is characterized by patterns of two-dimensional layers. In many cases (based on the value of n), motif β features the most stable structure predicted. A new motif, called γ, was also predicted, combining the essential characteristics of motifs α and β. As shown in FIG. 1A, two Sn—O bonds are shared with the carboxyl group from the same repeat unit while the other two Sn—O bonds link the central tin atom with two carboxyl groups from other chains. For each member of the polymer family examined, many low-energy structures of the same motif were predicted, differing only by the folding geometry of the methylene chains. The energetic information obtained for the most-stable structure of each motif indicates that these motifs are slightly different by a few meV per atom (data not shown). For each motif, the number of folding geometries of the methylene chains increases dramatically with the linker length, n, generating an associated "energy spectrum." Because these spectra heavily overlap, it is suggested that all of these motifs may easily coexist in the experimental samples under the ambient conditions.

Figure 2A:
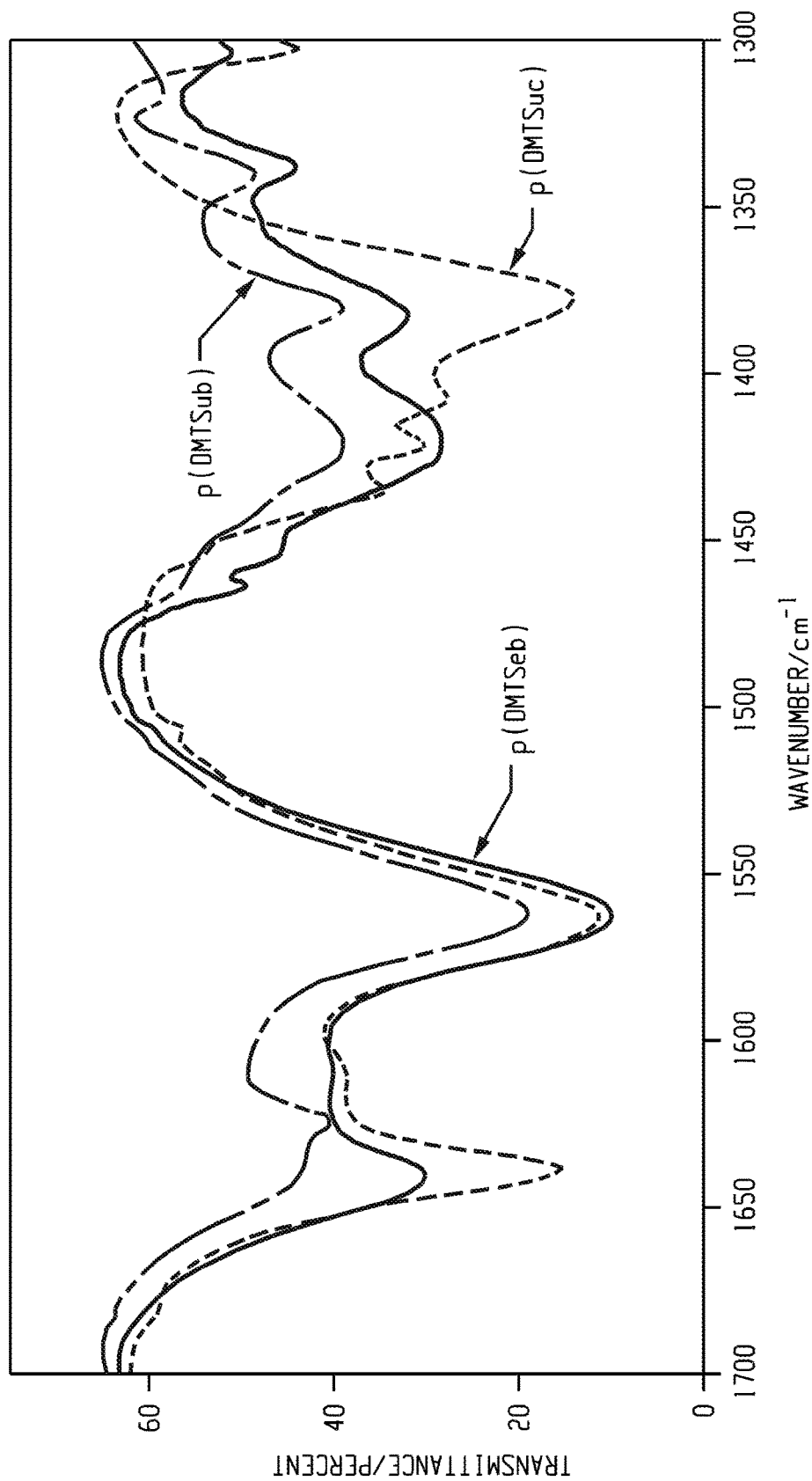
FIG. 2A shows IR spectra of three polymers.

To confirm the presence of these motifs within the polymers, infrared (IR) and X-ray diffraction (XRD) spectroscopy were performed. Within IR, the formation of the tin carboxylate bond is marked by the presence of five absorptions: a combination skeletal C—CO—O— coupled with Sn—O stretching and both asymmetric and symmetric bridging and non-bridging carbonyl stretches. All of the polymers have an IR absorption peak in the range of 610-656 cm$^{-1}$ indicative of the skeletal stretching. The asymmetric and symmetric bridging and non-bridging carbonyl stretches are characteristic of the formation of the octahedral coordination complexes. It has been previously hypothesized that both inter- and intra-chain complexes could be present, with the asymmetric non-bridging and bridging at 1635-1660 cm$^{-1}$ and 1550-1580 cm$^{-1}$, respectively and the symmetric bridging and non-bridging at 1410-1430 cm$^{-1}$ and 1350-1370 cm$^{-1}$, respectively. FIG. 2A shows the region in the IR spectra in which the coordination complexes of the aliphatic poly(dimethyltin esters) are observed. As illustrated in FIG. 2A all four of the absorbances are present in varying intensities, which is due to the presence of the three different motifs. As for the aliphatic poly(dimethyltin esters), the intensity of the symmetric bridging and non-bridging carbonyl absorption is approximately equal with the exception of p(DMTSuc) which exhibits a much stronger peak for the non-bridging than bridging. Since the α motif (intra-chain) of p(DMTSuc) theoretically does not form, then the non-bridging stretches should be reduced in intensity, but this is not the case. Therefore, the p(DMTSuc) must favor a hybrid type structure that has more intra-chain coordination versus inter-chain coordination.

Figure 2B:
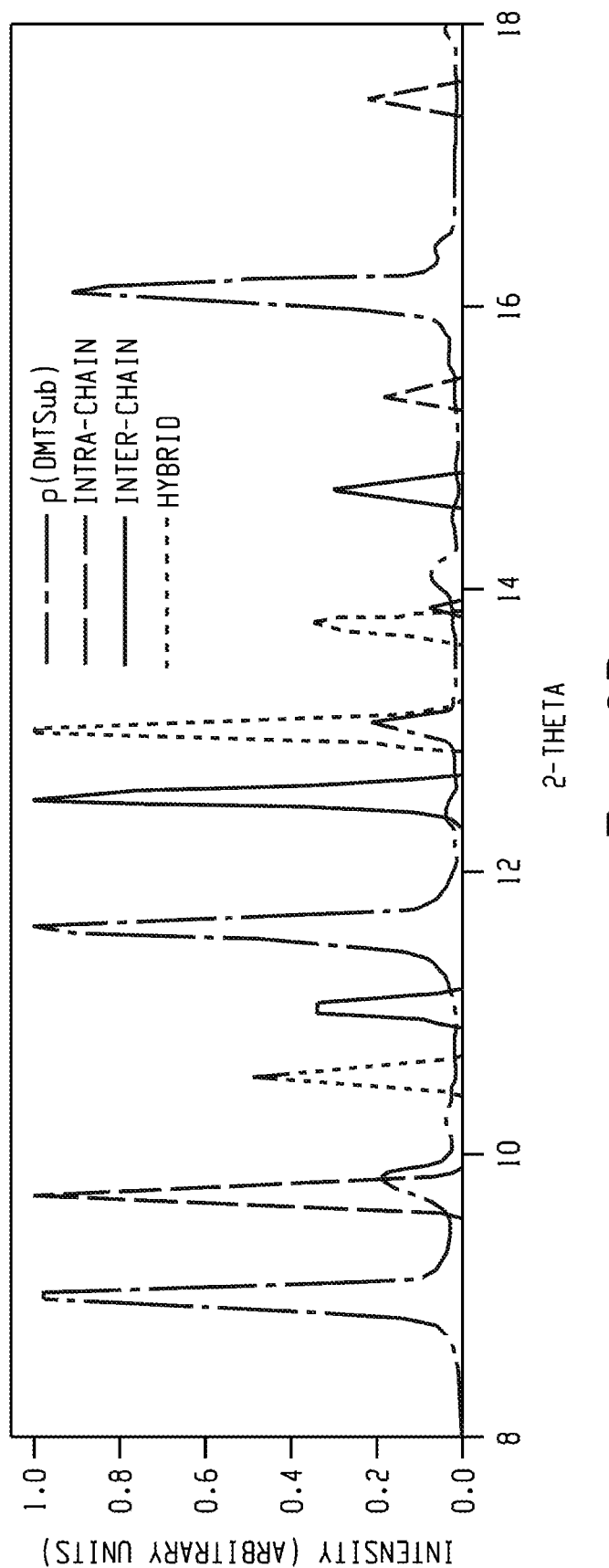
FIGS. 2B and 2C show XRD spectra for two of the polymers.
Figure 2C:
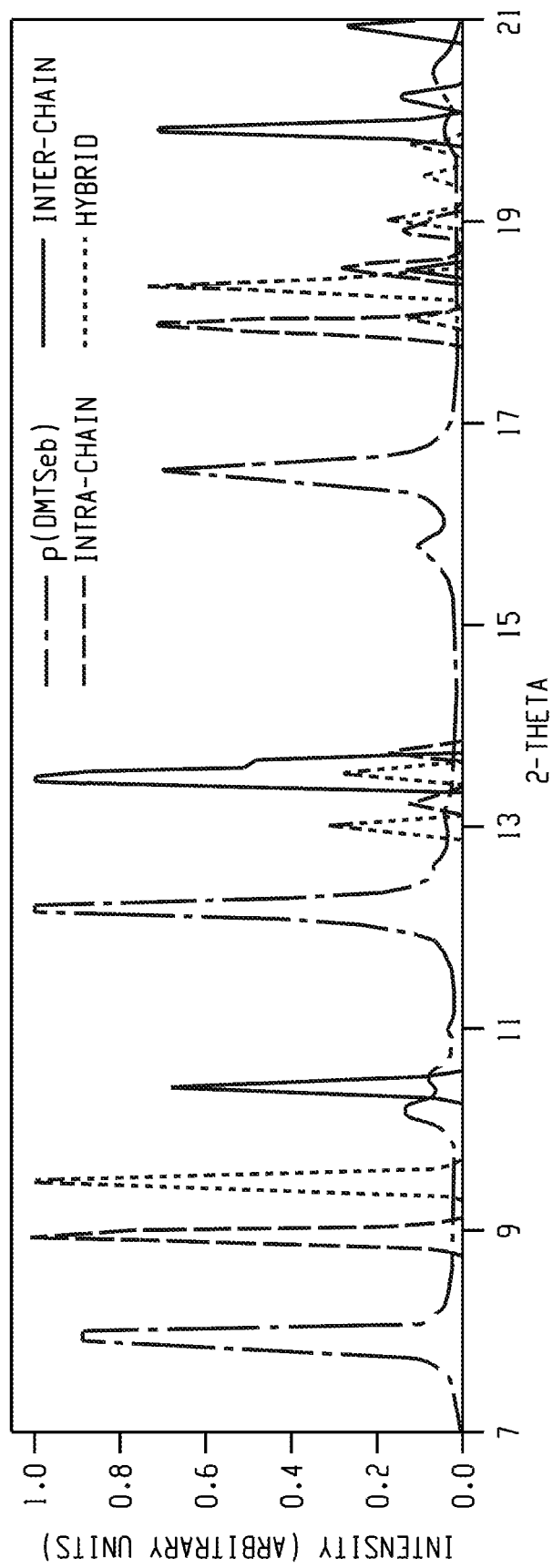

The XRD patterns illustrated in FIGS. 2B and 2C show that the structure of the polymers are not exact representations of the α, β and γ motifs, but a conglomeration of each of these motifs in some unknown ratio within the polymer chain. Though only two XRD patterns are shown in FIGS. 2B and 2C, this observation holds true for all of the aliphatic poly(organotin esters).

Dielectric Properties

Generally, $\in$ is a second-rank tensor quantity, describing the response of an insulator to the external electric field in the linear regime. There are two contributions to $\in$, an electronic dielectric-constant tensor $\in_{el}$ and an ionic dielectric constant tensor $\in_{ion}$. Given that at the macroscopic scales, polymers are not precisely ideal crystals and become isotropic, $\in$ and its contributions can naturally be reported as a scalar quantity represented by the trace of the respective tensors.

Figure 3A:
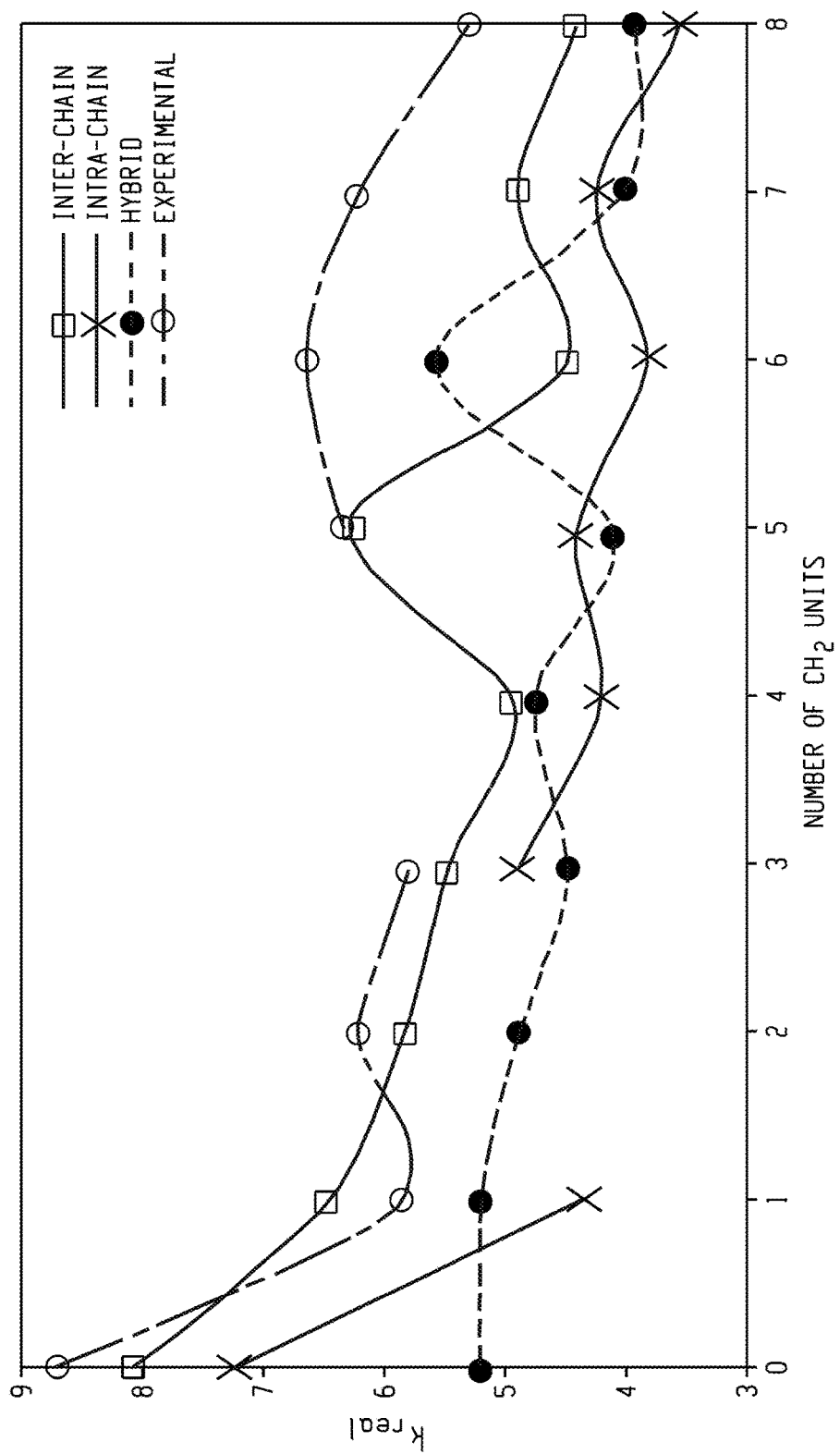
FIG. 3A shows theoretical and experimental values of dielectric constant of poly(dimethyltin esters) and FIG. 3B shows theoretical and experimental values of band gap of poly(dimethyltin esters).

Theoretically, $\in$ of the most stable structures of the motifs predicted for p[DMT(CH$_2$)$_n$] is shown in FIG. 3A to be heavily motif-dependent. Overall, the general trend is that $\in$ decreases as n becomes large. Up to n=11, $\in$ of the examined polymers is as high as 4.0, roughly 50% higher than $\in \approx 2.6$, calculated for poly(ethylene). The dependence of $\in$ on n is mostly originated from $\in_{ion}$ because $\in_{el} \approx 2.7$-3.0 for all of the examined values of n.

Regarding the motif dependence of $\in_{ion}$, a typical example for this strong dependence is the case of p(DMTPim), of which $\in_{ion}$ is calculated to be 1.74 and 3.44 for motifs α and β, respectively. To clarify this large difference, the vibration mode that most significantly contributes to $\in_{ion}$ of each motif was determined. For α, all four highly-polarized Sn—O bonds are in bending vibrations while for β, two of these bonds are clearly in their stretching modes. It is worth noting that because of the two-dimensional nature of motif β, the orientations of the four Sn—O bonds are "more isotropic" than motif α, thus stretching vibrations are more likely to occur. Because these stretching vibrations generally lead to larger changes in the Sn—O bond length, one may qualitatively expect that motif β is highly polarizable with higher $\in_{ion}$.

Pellets of the poly(dimethyltin esters) were pressed in order to compare the theoretical calculations to experimental dielectric values as well as the effect of increasing the methylene spacer between the tin dicarboxylate functional group on these values. The aliphatic poly(dimethyltin esters) represent polymers that have 33% functionality, p(DMTDec) to 100% functionality, p(DMTOx), in the polymer backbone. FIG. 3A represents the dielectric properties of the poly(dimethyltin esters) versus both BOPP and the theoretical calculations. Averaging the dielectric constant, $\in_{avg}$, from 1-1000 Hz, FIG. 3A, also illustrates that the dielectric constant follows the odd/even property rule commonly found in polymers. Comparing $\in_{avg}$ to the theoretical calculations shows that the experimental values are within 44% versus the average value of the three motifs. As seen in FIG. 3A the experimental dielectric constant is closer to the intra chain motif with the exception of p(DMTSub), and thus comparing these values the difference is within 29% with the best relation being p(DMTPim) which is 0.6%. The difference in the theoretical and experimental values can be attributed to the density functional theory (DFT) calculations being performed on systems on fully crystalline materials at 0 K. Further, as the number of methylene units is increased from 0 to 3 there is a decrease in the dielectric constant and then there is a spike in the dielectric constant to a second maxima at six methylene groups. This trend in dielectric constant is accurately predicted by the DFT calculations which show the spike at either five methylene groups for the inter- and intra-chain motifs or six for the hybrid structure. The maxima at six methylene groups is expected since the polymer chains take a hybrid motif as seen by IR and XRD. The dielectric constant of the aliphatic poly(dimethyltin esters) reaches a minimum of 5.3 for both p(DMTSeb) and p(DMTDec).

However, insulator performance is not only influenced by the dielectric constant but also the dielectric loss. P(DMTOx) and p(DMTSuc) suffer from the highest losses as a result of increased DC conductivity within the sample at lower frequencies which in the case of p(DMTOx) could be attributed to residual water even after extensive drying of the pellet in vacuo (see supporting information for TGAs). The loss factor of the majority of the aliphatic polymers is on the order of $10^{-2}$ which in comparison with polymers referenced before is on the same magnitude. P(DMTSeb) is the only aliphatic polymer that has a dissipation factor on the order of insulating polymers used in pulsed power systems (~$10^{-4}$). The expected trend in loss should be a decrease as the number of methylene groups is increased due to the polymer becoming more like poly(ethylene) with a decrease in dipole moment density in the backbone. However, these polymers do not exhibit this trend and the loss of these polymers is roughly on the same order of magnitude.

Energy Band Gaps

High breakdown strength, $E_{bd}$, is desirable for an ideal capacitor dielectric material, allowing it to work under high voltages and increasing its energy density. The breakdown strength is however not easy to compute. In a recent work, a model for estimating the intrinsic breakdown strength, an upper bound of $E_{bd}$, was developed at the level of first-principle calculations, requiring a description of the electron-phonon interactions. The energy band gap, $E_g$, the quantity believed to have some correlations with $E_{bd}$ was examined. In particular, for a material with a small $E_g$, $E_{bd}$ is definitely low while a high value of $E_g$ could be an indicator for a possibly high $E_{bd}$.

$E_g$ is usually underestimated by conventional DFT calculations with the Perdew-Burke-Ernzerhof (PBE) exchange-correlation (XC) functional. For polyethylene, $E_g$ is estimated to be about 6.8 eV using PBE, which is considerably smaller than the experimental value of 8.8 eV. Using the Heyd-Scuseria-Ernzerhof (HSE06) hybrid functional for the XC energies is much more computationally expensive but is also commonly known to be a better option for estimating $E_g$. With this functional, the calculated band gap is clearly improved to be $E_g \approx 8.4$ eV.

Figure 3B:
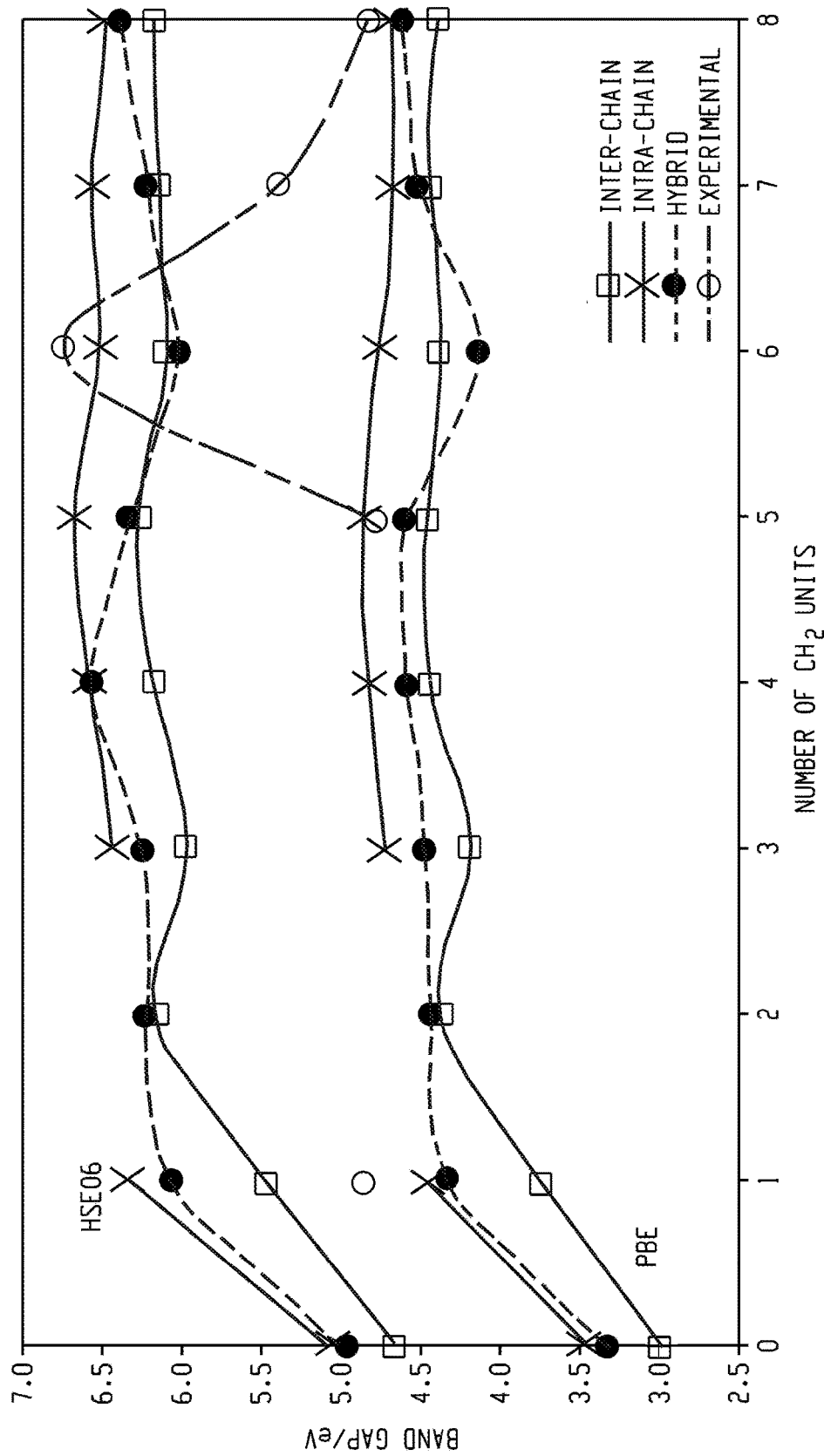

Films of the poly(dimethyltin esters) were casted from m-cresol solutions, with the exception of p(DMTMal) and p(DMTSub) which were casted from 3:1 (v:v) HFIP:CHCl$_3$ and 2:1 (v:v) m-cresol:1,2-DCE respectively, onto quartz glass slides and measured using UV-vis. The $E_g$ was then calculated from Planck's relation. FIG. 3B illustrates the experimental polymer band gaps versus the calculated results. The experimental band gaps of the aliphatic poly (dimethyltin esters) range from 4.697 to 5.391 eV, which could be indicative of a high breakdown potential for this system of polymers. Compared to the calculated band gaps, the measured band gaps of the polymers were within 25% of the averaged calculated band gap for the intra-chain, inter-chain and hybrid motifs for each polymer for both PBE and HSE06 functionals, with the only outlier being p(DMTSub) versus the PBE result. Given that ∈ and $E_g$ evolve oppositely as n increases, n=5-8 can be identified as the optimal length of the methylene linker segment in which the energy density of the polymer may be maximized. As mentioned previously, the breakdown field strengths of these materials have to be determined for this conclusion to be completely appropriate.

Effect of Reaction Conditions on Dielectric Properties

Table 2 tabulates the synthesis data of poly(dimethyltin glutarate) in various solvent systems.

TABLE 2

Effect of reaction conditions on the yield, molecular weight and dielectric properties of p(DMTGlu).

| Solvent | Glutaric Acid [M] | Me$_2$SnCl$_2$ [M] | Yield [%] | $M_n$ [g mol$^{-1}$][a] |
|---|---|---|---|---|
| Water/THF | 0.78[b] | 0.68[c] | 73.9 | 66,139.22 |
| Water/THF | 1.10[b] | 1.09[c] | 66.9 | 68,991.38 |
| Water/THF | 1.50[b] | 1.48[c] | 51.1 | 71,184.35 |
| Water/DMAc | 0.77[b] | 0.67[c] | 66.8 | 63,513.94 |
| Water/NMP | 0.77[b] | 0.74[c] | 75.1 | 76,017.83 |
| Water/m-Cresol | 0.77[b] | 0.68[c] | 58.2 | 73,041.92 |
| DMAc | 0.78 | 1.02 | 62.2 | 60,106.31 |
| m-Cresol | 0.78 | 1.03 | 58.2 | 66,532.12 |

[a]Determined by $^1$H NMR
[b]Concentration in aqueous phase
[c]Concentration in organic phase Increasing the monomer concentration in both the aqueous and tetrahydrofuran (THF) phase results in an increase of the $M_n$ of the polymer, ca. 66,000 to 71,000 g mol$^{-1}$, but at a reduced yield, 73.9 to 51.1%. Changing the organic phase to other polar solvents, such as dimethylacetamide (DMAc), N-methyl-2-pyrrolidone (NMP) and m-cresol, also results in an increase in molecular weight. Poly(dimethyltin glutarate) synthesized with NMP as the organic solvent gave the highest yield and molecular weight of the four solvent systems tested.

The synthesis of poly(dimethyltin glutarate) was also carried out in all organic solvent to reduce the chance of base hydrolysis of the tin carboxylate in the presence of water. The base was switched from sodium hydroxide to triethylamine. The molecular weight of the p(DMTGlu) was lower when comparing the all organic reaction with the interfacial polymerization using the same polar solvent. In comparison to the water/THF system the all DMAc reaction had lower molecular weight while the NMP system gave higher molecular weight. In all of the systems tested the molecular weight was fairly consistent, about 60,100 to 76,000 g mol$^{-1}$, which illustrates the versatility of this polymerization.

Figure 4:
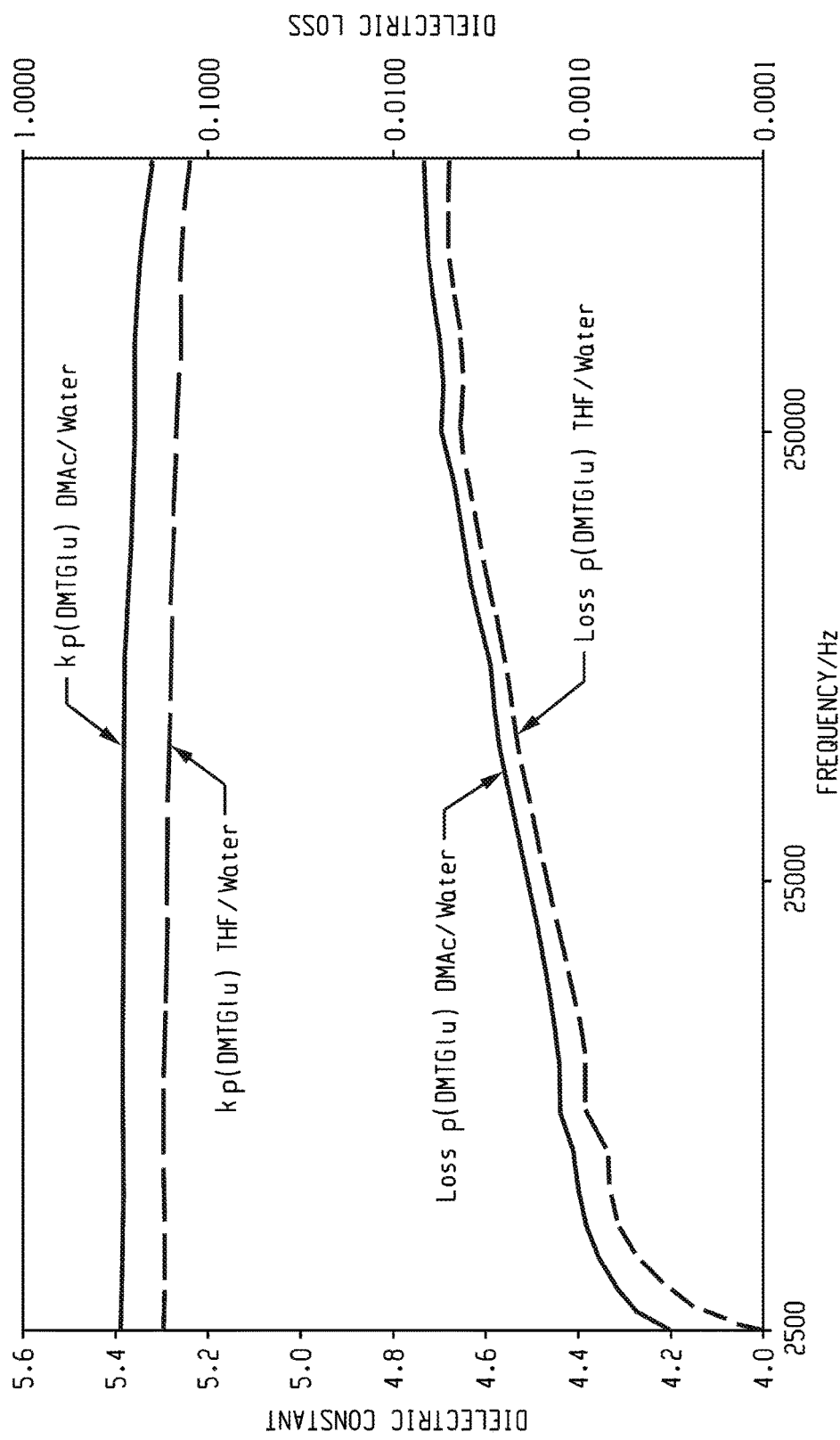
FIG. 4 shows an organic solvent phase effect on dielectric properties of p(DMTGlu).

Pellets were pressed of p(DMTGlu) synthesized using THF and DMAc to determine whether the solvent used for the organic phase had an effect on the dielectric properties of the polymer. Testing the polymer over a frequency range of 2.5 kHz to 1 MHz proved that the dielectric properties are not affected by organic phase, FIG. 4. There was a slight increase in dielectric constant from 5.27 to 5.36 and dielectric loss from 0.23% to 0.29% for the THF and DMAc systems respectively. The difference in properties could be due to the minor difference in molecular weight or some residual solvent in the polymer powder. However, this shows that dielectric properties have saturated and that the polymerization can be carried out in a number of ways.

Effect of Blending on Film Quality and Dielectric Properties

The homopolymer (p(DMT 3,3-DMG)) was synthesized using 3,3-dimethylglutaric acid as the diacid monomer. The presence of the two methyl groups causes chain disruption, breaking reducing the size of the large crystal regions seen in the films of some aliphatic poly(dimethyltin esters). Films of p(DMT 3,3-DMG) and the 20:80 (w:w) blends of p(DMT-Glu) and p(DMT) with p(DMT 3,3-DMG) were prepared. The homopolymer of p(DMT 3,3-DMG) appears like a clear glass with the yellowish tint being due to the remnant m-cresol and the blends exhibited this same appearance up to about 50/50 mixtures. Therefore, 3,3-dimethylglutarate is sufficient in reducing the large crystal regions. Surprisingly, there was no increase in free volume by adding another monomer that contains side chains based on dielectric testing. The blends of p(DMTGlu):p(DMT 3,3-DMG) and p(DMTSub):p(DMT 3,3-DMG) exhibit dielectric constants in the range of 5.0-7.5 and 5.0-7.0 respectively.

Effect of Aromaticity on the Dielectric Constant of Organotin Esters

The effect of aromaticity on the dielectric constant of organotin esters was studied by synthesizing aromatic poly (dimethyltin esters) in which the aromatic ring is in the α position to the carboxylate group. The five aromatic monomers used in the study are either electron withdrawing (pyridine ring), "neutral" (benzene ring) or donating (thiophene ring) in nature. Synthetically, these polymers are insoluble even in acetic acid so molecular weight could not be determined From the IR and XRD spectra the polymers exhibit both the inter- and intra-chain coordination complexes. Thermally, these polymers exhibit higher degradation temperatures, >300° C. with the lowest polymer degrading at 303° C., versus the aliphatic polymers.

The aromatic diacid monomers chosen have secondary dipoles, that is in the case of benzene ring systems the carboxylate groups are either para-, no dipole, or meta-positioned, second dipole moment, to each other. The pyridine and thiophene ring systems also add a third dipole due to the heteroatom. Theoretically the dielectric constant of these polymers increases through the following trend; "neutral"<withdrawing<donating. However, the calculations do not follow the trend that the meta-positioning of the carboxylate groups would lead to a higher dielectric constant. Within the benzene ring system the meta-positioning shows a lower dielectric constant while the pyridine rings show the opposite.

Compared to the theoretical calculations the experimental dielectric results show that two para-positioned carboxylate polymers, p(DMTTer) and p(DMT 2,5-DPA), have the lowest dielectric constants and the other three polymers with the carboxylates in the meta-positioning, p(DMTIso), p(DMT 2,6-DPA) and p(DMT 2,5-TDC), have the highest dielectric constants. Comparing the polymers in terms of their electronic contribution, the electron withdrawing pyridine ring gives rise to a slightly higher dielectric constant than the benzene derivative, though this change is very small and cannot be described as significant. The thiophene containing polymer lies in between the benzene and pyridine ring system polymers. All of these polymers exhibit a dissipation on the order of $10^{-2}$, with all of them being below three percent. The polymer, p(DMTIso), exhibits the lowest dissipation, on the order of $10^{-3}$, up to measurement temperatures of 150° C. Though this study does not correlate well to the theoretical calculations, it does show the benefit of having an aromatic ring in the α position on the dielectric constant up to high temperatures.

Effect of Chirality

Like the blending study, the addition of a chiral monomer into the polymer chain could give enough chain disruption to reduce the size of the crystals. In this study tartaric acid is used because it is well characterized and commercially available in three chiral forms, D, L and the racemic DL. The other effect that could be introduced through the addition of tartaric acid is a disruption in the coordination complex. The electron pairs on the hydroxyl groups could also coordinate to the tin atom, in competition with the lone pairs on the carbonyls, forming stable five and six membered rings. The hydroxyl groups will also form hydrogen bonding complexes between chains as well as within chains. The homopolymers based on D- or L-tartaric acid took longer to precipitate from the reaction solution versus the DL-tartaric acid. This is explained by examining the XRD pattern, which shows that the D- and L-tartaric acid based polymers are more amorphous than the crystalline DL-tartaric acid based polymer. The XRD patterns of the 50/50 copolymers of glutaric acid and the three different tartaric acid monomers exhibit some differences. The 50/50 glutaric acid/DL-tartaric acid has fewer peaks than the D- and L-tartaric acid polymers meaning that there is more symmetry in that particular polymer, which could be due tighter chain packing in the polymer.

The dielectric constant of p(DMT D-Tar) is expected to be higher than p(DMTGlu) due to the higher density of functionality in p(DMT D-Tar) which is what is observed experimentally, 6.2 versus 5.8. However, the copolymers glutaric acid and tartaric acid would be assumed to fall in between the two homopolymers which is not observed experimentally. All three copolymers exhibit lower dielectric constants than p(DMTGlu).

The singular forms "a," "an," and "the" include plural referents unless the context clearly dictates otherwise. "Or" means "and/or." The endpoints of all ranges directed to the same component or property are inclusive and independently combinable. Disclosure of a narrower range or more specific group in addition to a broader range is not a disclaimer of the broader range or larger group.

Unless defined otherwise, technical and scientific terms used herein have the same meaning as is commonly understood by one of skill in the art to which this invention belongs. A "combination" is inclusive of blends, mixtures, alloys, reaction products, and the like.

As used herein, the term "hydrocarbyl" and "hydrocarbon" refers broadly to a substituent comprising carbon and hydrogen, optionally with 1 to 3 heteroatoms, for example, oxygen, nitrogen, halogen, silicon, sulfur, or a combination thereof; "alkyl" refers to a straight or branched chain, saturated monovalent hydrocarbon group; "alkylene" refers to a straight or branched chain, saturated, divalent hydrocarbon group; "alkylidene" refers to a straight or branched chain, saturated divalent hydrocarbon group, with both valences on a single common carbon atom; "alkenyl" refers to a straight or branched chain monovalent hydrocarbon group having at least two carbons joined by a carbon-carbon double bond; "cycloalkyl" refers to a non-aromatic monovalent monocyclic or multicyclic hydrocarbon group having at least three carbon atoms, "cycloalkenyl" refers to a non-aromatic cyclic divalent hydrocarbon group having at least three carbon atoms, with at least one degree of unsaturation; "aryl" refers to an aromatic monovalent group containing only carbon in the aromatic ring or rings; "arylene" refers to an aromatic divalent group containing only carbon in the aromatic ring or rings; "alkylaryl" refers to an aryl group that has been substituted with an alkyl group as defined above, with 4-methylphenyl being an exemplary alkylaryl group; "arylalkyl" refers to an alkyl group that has been substituted with an aryl group as defined above, with benzyl being an exemplary arylalkyl group; "acyl" refers to an alkyl group as defined above with the indicated number of carbon atoms attached through a carbonyl carbon bridge (—C(=O)—); "alkoxy" refers to an alkyl group as defined above with the indicated number of carbon atoms attached through an oxygen bridge (—O—); and "aryloxy" refers to an aryl group as defined above with the indicated number of carbon atoms attached through an oxygen bridge (—O—).

Unless specifically otherwise indicated, each of the foregoing groups can be unsubstituted or substituted, provided that the substitution does not significantly adversely affect synthesis, stability, or use of the compound or polymer. The term "substituted" as used herein means that at least one hydrogen on the designated atom or group is replaced with another group, provided that the designated atom's normal valence is not exceeded. When the substituent is oxo (i.e., =O), then two hydrogens on the atom are replaced. Combinations of substituents and/or variables are permissible provided that the substitutions do not significantly adversely affect synthesis or use of the compound. Exemplary groups that can be present on a "substituted" position include, but are not limited to, cyano; hydroxyl; nitro; alkanoyl (such as a C2-6 alkanoyl group such as acyl); carboxamido; C1-6 or C1-3 alkyl, cycloalkyl, alkenyl, and alkynyl (including groups having at least one unsaturated linkages and from 2 to 8, or 2 to 6 carbon atoms); C1-6 or C1-3 alkoxys; C6-10 aryloxy such as phenoxy; C1-6 alkylthio; C1-6 or C1-3 alkylsulfinyl; C1-6 or C1-3 alkylsulfonyl; aminodi(C1-6 or C1-3)alkyl; C6-12 aryl having at least one aromatic rings (e.g., phenyl, biphenyl, naphthyl, or the like, each ring either substituted or unsubstituted aromatic); C7-19 alkylenearyl having 1 to 3 separate or fused rings and from 6 to 18 ring carbon atoms, with benzyl being an exemplary arylalkyl; or arylalkoxy having 1 to 3 separate or fused rings and from 6 to 18 ring carbon atoms, with benzyloxy being an exemplary arylalkoxy.

All cited patents, patent applications, and other references are incorporated herein by reference in their entirety. However, if a term in the present application contradicts or conflicts with a term in the incorporated reference, the term from the present application takes precedence over the conflicting term from the incorporated reference.

While typical embodiments have been set forth for the purpose of illustration, the foregoing descriptions should not be deemed to be a limitation on the scope herein. Accordingly, various modifications, adaptations, and alternatives can occur to one skilled in the art without departing from the spirit and scope herein.

The invention claimed is:

1. An organotin ester polymer comprising units of formula (I)

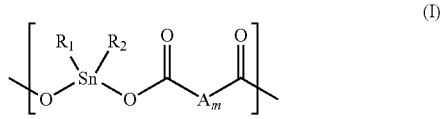

wherein
$R_1$ and $R_2$ are each independently substituted or unsubstituted $C_{1-12}$ alkyl, substituted or unsubstituted $C_{3-12}$ cycloalkyl, substituted or unsubstituted $C_{6-12}$ aryl, substituted or unsubstituted $C_{3-6}$ heteroalkyl, substituted or unsubstituted $C_{2-12}$ alkynyl, or substituted or unsubstituted $C_{2-12}$ alkynyl;

A is substituted or unsubstituted $C_{1-36}$ hydrocarbylene, divalent heteroaryl, or ether; and m is 0 or 1, wherein the polymer has a number average molecular weight of 20,000 g mol$^{-1}$ or greater.

2. The polymer of claim 1, wherein the polymer is coordinated with a high dielectric constant ligand.

3. The polymer of claim 2, wherein the high dielectric constant ligand is water; ammonia; hydrogen sulfide; an alcohol; an amine; or a thiol.

4. The polymer of claim 1, wherein $R_1$ and $R_2$ are each independently unsubstituted $C_{1-6}$ alkyl.

5. The polymer of claim 1, wherein $R_1$ and $R_2$ are each methyl.

6. The polymer of claim 1, wherein A is substituted or unsubstituted $C_{1-12}$ alkyl, substituted or unsubstituted $C_{3-12}$ cycloalkyl, substituted or unsubstituted $C_{6-12}$ aryl, substituted or unsubstituted $C_{3-6}$ heteroalkyl, substituted or unsubstituted $C_{2-12}$ alkenyl, substituted or unsubstituted $C_{2-12}$ alkynyl, substituted or unsubstituted $C_{6-12}$ heteroaryl, or substituted or unsubstituted $C_{1-36}$ alkyl whose chain is interrupted by one or more units of substituted or unsubstituted $C_{6-12}$ aryl or one or more units of substituted or unsubstituted $C_{6-12}$ heteroaryl.

7. The polymer of claim 1, wherein A is substituted or unsubstituted $C_{1-12}$ alkyl.

8. The polymer of claim 1, wherein A is —O—(—R$_4$—O—)$_n$— wherein each R$_4$ is independently a divalent $C_{1-8}$ alkyl or divalent $C_{3-12}$ cycloalkyl, and n is 1 to 12.

9. The polymer of claim 1, wherein the polymer is poly(dimethyltin oxalate), poly(dimethyltin malonate), poly(dimethyltin succinate), poly(dimethyltin glutarate), poly(dimethyltin adipate), poly(dimethyltin pimelate), poly(dimethyltin suberate), poly(dimethyltin azelate), poly(dimethyltin sebacate), poly(dimethyltin dodecanediate), poly(dimethyltin 3,3-dimethylglutarate), poly(dimethyltin poly(ethylene glycol) bis(carboxylate-250), poly(dimethyltin terephthalate), poly(dimethyltin isophthalate), poly(dimethyltin 2,5-pyridinedicarboxylate), poly(dimethyltin 2,6-pyridinedicarboxylate), poly(dimethyltin 2,5-thiophenedicarboxylate), poly(dimethyltin L-tartrate), poly(dimethyltin D-tartrate), poly(dimethyltin DL-tartrate), poly(dimethyltin 50/50 L-tartrate/glutarate), poly(dimethyltin 50/50 D-tartrate/glutarate), poly(dimethyltin 50/50 DL-tartrate/glutarate), or a combination comprising at least one of the foregoing.

10. The polymer of claim 1, wherein a dielectric constant of the polymer is greater than or equal to 4.5.

11. The polymer of claim 1, wherein an energy band gap is greater than or equal to 4.4 eV.

12. The polymer of claim 1, wherein the polymer has a number average molecular weight of 20,000 to 150,000 g mol$^{-1}$.

13. The polymer of claim 1, wherein the polymer has a thermogravimetric analysis onset temperature of greater than or equal to 200° C.

14. The polymer of claim 12, wherein the polymer has a dielectric constant that is greater than or equal to 4.5.

15. The polymer of claim 12, wherein an energy band gap is greater than or equal to 4.4 eV.

16. A composition comprising the polymer of claim 1.

17. An article comprising the polymer of claim 1.

18. The article of claim 17, wherein the article is a capacitor, field effect transistor, electromechanical system, printed circuit, or photovoltaic.

19. A process for producing the polymer of claim 1, comprising contacting an organic dicarboxylic acid and dialkytin dichloride.

20. The process of claim 19, wherein contacting is in the presence of solvent.

* * * * *